(12) United States Patent
Matsumoto et al.

(10) Patent No.: US 12,484,685 B2
(45) Date of Patent: Dec. 2, 2025

(54) HEATING TOOL AND METHOD FOR MANUFACTURING HEATING TOOL

(71) Applicant: Kao Corporation, Tokyo (JP)

(72) Inventors: Ryunosuke Matsumoto, Arakawa-ku (JP); Ryuji Matsunaga, Utsunomiya (JP); Kazutoshi Ootsuka, Takanezawa-machi (JP)

(73) Assignee: Kao Corporation, Tokyo (JP)

( * ) Notice: Subject to any disclaimer, the term of this patent is extended or adjusted under 35 U.S.C. 154(b) by 853 days.

(21) Appl. No.: 17/632,006

(22) PCT Filed: Sep. 11, 2020

(86) PCT No.: PCT/JP2020/034500
§ 371 (c)(1),
(2) Date: Feb. 1, 2022

(87) PCT Pub. No.: WO2021/090575
PCT Pub. Date: May 14, 2021

(65) Prior Publication Data
US 2022/0273089 A1  Sep. 1, 2022

(30) Foreign Application Priority Data

Nov. 7, 2019  (JP) .................................. 2019-202437

(51) Int. Cl.
*B32B 3/10* (2006.01)
*A45D 44/00* (2006.01)
(Continued)

(52) U.S. Cl.
CPC .............. *A45D 44/002* (2013.01); *B32B 7/12* (2013.01); *B32B 27/10* (2013.01); *A45D 2200/155* (2013.01); *B32B 2535/00* (2013.01)

(58) Field of Classification Search
None
See application file for complete search history.

(56) References Cited

U.S. PATENT DOCUMENTS

| 2001/0023366 A1 | 9/2001 | Usui |
| 2010/0241199 A1 | 9/2010 | Hidaka et al. |
| 2016/0128866 A1 | 5/2016 | Oka et al. |

FOREIGN PATENT DOCUMENTS

| CN | 1180515 A | 5/1998 |
| EP | 2 177 184 A1 | 4/2010 |

(Continued)

OTHER PUBLICATIONS

Machine translation of WO-2019021928-A1 (Year: 2019).*

(Continued)

*Primary Examiner* — Christopher M Polley
(74) *Attorney, Agent, or Firm* — Oblon, McClelland, Maier & Neustadt, L.L.P.

(57) ABSTRACT

The present invention relates to a warming tool (1) in which a heat generating element (3) is held between a topsheet (5) that faces a heating target and a backsheet (6) that is located on a side away from the heating target, and a method for manufacturing the same. The heat generating element (3) has a first sheet (3*f*) arranged opposing the topsheet (5), a second sheet (3*g*) arranged opposing the backsheet (6), and a heat generating portion (3*a*) sandwiched between the first sheet (3*f*) and the second sheet (3*g*). In the warming tool (1), a perfume (8) and an adhesive (7) are arranged between the second sheet (3*g*) and the backsheet (6), and a region in which the adhesive (7) is arranged and a region in which the perfume (8) is not arranged overlap each other in a plan view. In the manufacturing method, the perfume is added to a surface of the second sheet (3*g*) that is planned to oppose the backsheet (6), or to a surface of the backsheet (6) that is planned to oppose the heat generating element (3), and the heat generating element (3) is held such that the backsheet (6) and the second sheet (3*g*) oppose each other.

11 Claims, 11 Drawing Sheets

(51) Int. Cl.
  *B32B 7/12* (2006.01)
  *B32B 27/10* (2006.01)

(56) References Cited

FOREIGN PATENT DOCUMENTS

| | | | | | |
|---|---|---|---|---|---|
| JP | 2006-340928 | A | | 12/2006 | |
| JP | 2008-17957 | A | | 1/2008 | |
| JP | 2009-34481 | A | | 2/2009 | |
| JP | 2009131597 | A | * | 6/2009 | ............. A61F 7/034 |
| JP | 2010-51690 | A | | 3/2010 | |
| JP | 2011-131093 | A | | 7/2011 | |
| JP | 2013-42963 | A | | 3/2013 | |
| JP | 2015-16309 | A | | 1/2015 | |
| JP | 2016-47478 | A | | 4/2016 | |
| JP | 2019-24924 | A | | 2/2019 | |
| TW | 201919550 | A | | 6/2019 | |
| WO | WO-2019021928 | A1 | * | 1/2019 | ............... A61F 7/03 |

OTHER PUBLICATIONS

Machine translation of JP-2009131597-A (Year: 2009).*
International Search Report mailed on Nov. 2, 2020 in PCT/JP2020/034500 filed on Sep. 11, 2020 (2 pages).
Extended European Search Report issued Jun. 16, 2023 in European Patent Application No. 20884281.5, 4 pages.

* cited by examiner

HEATING TOOL AND METHOD FOR MANUFACTURING HEATING TOOL

TECHNICAL FIELD

The present invention relates to a warming tool and a method for manufacturing a warming tool.

BACKGROUND ART

The applicant of the present invention has previously proposed a heat generating tool that is scented with a perfume composition (Patent Literature 1). This heat generating tool has the advantage of favorably giving off the scent during use and being less subject to deterioration of the scent during storage.

CITATION LIST

Patent Literature

Patent Literature 1: JP 2010-51690A

SUMMARY OF INVENTION

The present invention relates to a method for manufacturing a warming tool in which a heat generating element having a first sheet, a second sheet, and a heat generating portion sandwiched therebetween is held between a topsheet and a backsheet, the topsheet facing a heating target during use, and a backsheet being located on a side away from the heating target.

In an embodiment, the manufacturing method includes adding a perfume to a surface of the second sheet that is planned to oppose the backsheet, or adding a perfume to a surface of the backsheet that is planned to oppose the heat generating element.

In an embodiment, the manufacturing method includes, after adding the perfume, arranging the heat generating element such that the backsheet and the second sheet oppose each other and causing the heat generating element to be held between the topsheet and the backsheet.

Also, the present invention relates to a warming tool.

In an embodiment, the warming tool includes a topsheet which faces a heating target during use; a backsheet which is located on a side away from the heating target; and a heat generating element which is sandwiched between the topsheet and the backsheet.

In an embodiment, the heat generating element has a first sheet that is arranged so as to oppose the topsheet, a second sheet that is arranged so as to oppose the backsheet, and a heat generating portion that is sandwiched between the first sheet and the second sheet.

In an embodiment, in the warming tool, a perfume and an adhesive are arranged between the second sheet and the backsheet, the adhesive bonding the second sheet and the backsheet to each other.

In an embodiment, in a plan view of the warming tool, a region in which the adhesive is arranged is arranged in a region in which the perfume is not arranged.

Other features of the present invention will become apparent from the claims and the following description.

DESCRIPTION OF EMBODIMENTS

Figure 1:
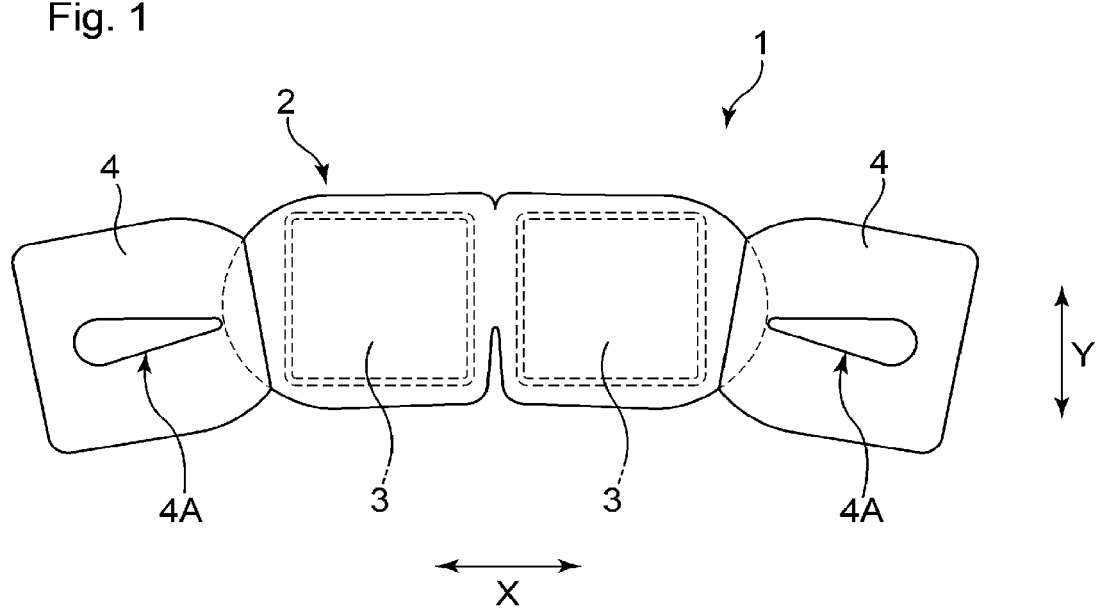
FIG. 1 is a plan view showing an embodiment of a warming tool that is manufactured using a manufacturing method of the present invention.

In this specification, in the case where an upper limit value or a lower limit value, or upper and lower limit values of a numerical value are specified, the upper limit value and the lower limit value themselves are also included. Moreover, even if not explicitly stated, it should be construed that all the numerical values, or numerical value ranges, equal to or smaller than the upper limit value of a numerical value or equal to or greater than the lower limit value thereof, or within the range between the upper and lower limit values thereof are described.

As used herein, "a", "an", and the like should be construed as "one or more".

In view of the foregoing and following disclosure herein, it will be understood that various modifications and alterations can be made to the present invention. Accordingly, it should be appreciated that the present invention can also be implemented in embodiments that are not clearly stated in this specification, without departing from the technical scope as defined in the claims.

The entire contents of patent literatures mentioned above and below are incorporated by reference in this specification as a part of the contents thereof.

This application is based upon and claims the benefit of priority from Japanese Patent Application No. 2019-202437 filed on Nov. 7, 2019, the entire contents of which are incorporated by reference in this specification as a part thereof.

There are cases where warming tools are manufactured using different types of perfumes for different product types for the purpose of improving the feel of the products when users use them. In such cases, depending on the timing of adding a perfume in manufacturing warming tools, the perfume may adhere to a manufacturing apparatus and contaminate the manufacturing apparatus. When products to which another perfume is added are to be manufactured using this manufacturing apparatus, a large number of constituent members of the apparatus have to be unavoidably discarded, or the apparatus has to be stopped and cleaned, in order to remove the perfume adhering to the apparatus. For this reason, there is a demand for improving the production efficiency. In this respect, Patent Literature 1 gave no consideration, and there was room for improvement.

Moreover, in the case where warming tools with different types of perfumes, or warming tools in which a perfume is used and warming tools in which no perfume is used, are to be manufactured using a single manufacturing apparatus, joining conditions for joining constituent members of the warming tools have to be appropriately set and altered according to whether or not a perfume is used, or the type of the perfume that is used. For this reason, there is a demand for improving the production efficiency. In this respect as well, Patent Literature 1 gave no consideration, and there was room for improvement.

Furthermore, in the case where warming tools are scented with a perfume, depending on the position that is scented with the perfume, desired heat generating performance may not be realized due to the presence of the perfume, or the perfume may adhere to the user's skin and cause discomfort such as a sticky feel. In this respect as well, Patent Literature 1 gave no consideration, and there was room for improvement.

Therefore, the present invention relates to a further improvement in a warming tool and a method for manufacturing a warming tool.

Hereinafter, the present invention will be described based on preferred embodiments thereof with reference to the drawings.

A warming tool of the present invention can be embodied as a so-called eye mask type. This type of warming tool can be used by being brought into contact with a heating target, such as both eyes of a human and the skin in the vicinity thereof, so as to cover the heating target, to thereby apply steam heated to a predetermined temperature and gentle heat to the eyes and the skin around the eyes.

FIG. 1 shows a preferred embodiment such as this, of the present invention.

A warming tool 1 of the eye mask type includes, typically as shown in FIG. 1, a main body portion 2 that is elongated in a longitudinal direction X and that has a shape that can cover both eyes of a user during use, a heat generating element 3 included in the main body portion 2, and a pair of ear strap portions 4.

In the following description, a direction that is orthogonal to the longitudinal direction X will also be referred to as a length direction Y.

The main body portion 2 of the warming tool 1 typically includes: a topsheet 5 that faces a heating target such as the user's skin during use; and a backsheet 6 that is located on a side away from the heating target during use.

Figure 2A:
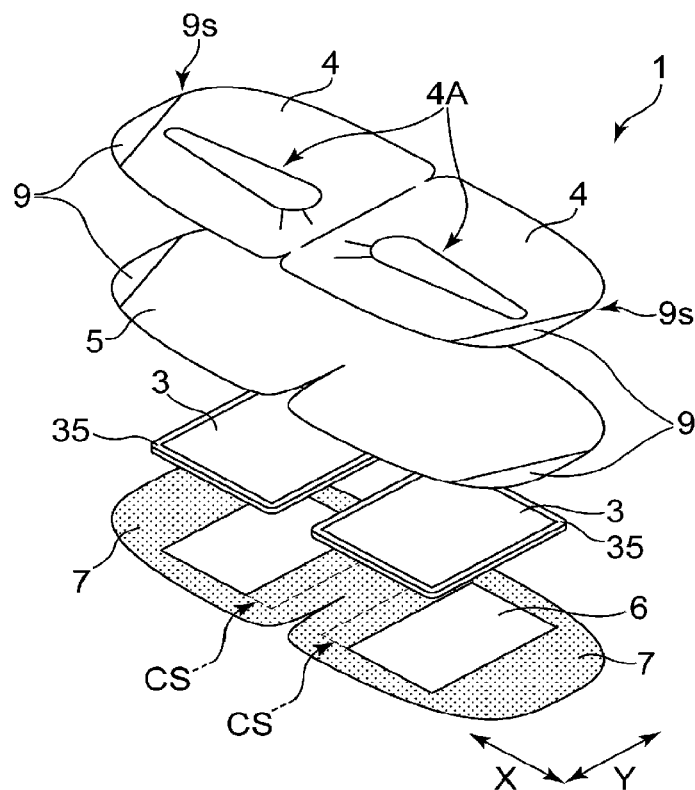
FIG. 2(a) is an exploded perspective view of an embodiment of a warming tool that is manufactured using the manufacturing method of the present invention.
Figure 2B:
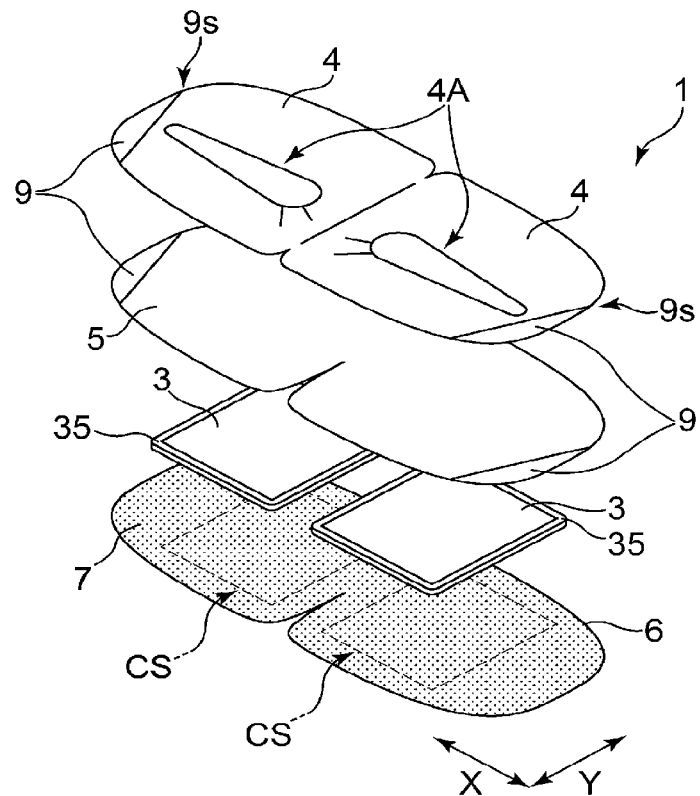
FIG. 2(b) is an exploded perspective view of another embodiment of the warming tool that is manufactured using the manufacturing method of the present invention.
Figure 3A:
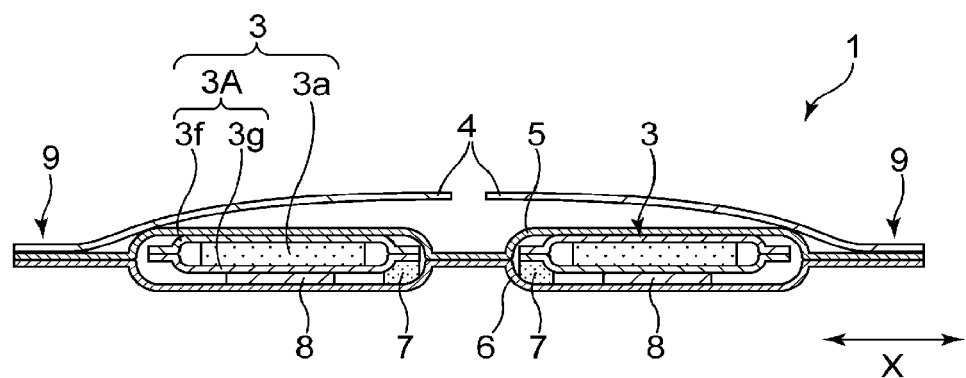
FIG. 3(a) is a cross-sectional view of the warming tool shown in FIG. 2(a), taken along a longitudinal direction X thereof.
Figure 3B:
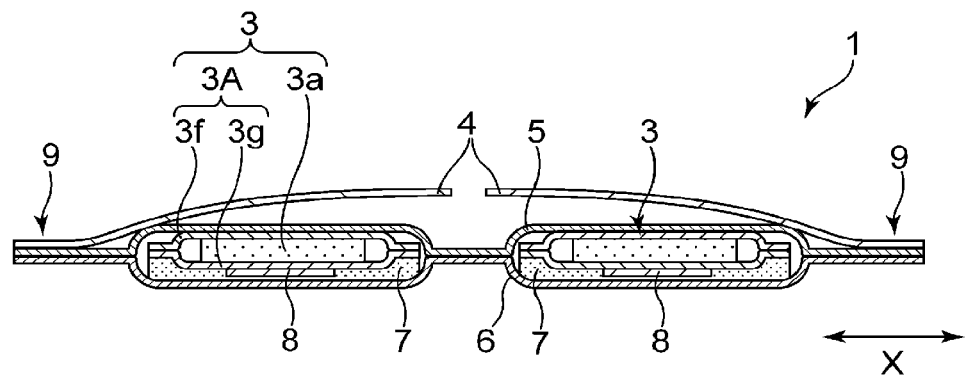
FIG. 3(b) is a cross-sectional view of the warming tool shown in FIG. 2(b), taken along the longitudinal direction X thereof.

FIGS. 2(a) and 2(b) show exploded perspective views of warming tools 1. FIG. 3(a) shows a cross-sectional view of the warming tool 1 shown in FIG. 2(a), taken along the longitudinal direction X. Also, FIG. 3(b) shows a cross-sectional view of the warming tool 1 shown in FIG. 2(b), taken along the longitudinal direction X.

In these drawings, the upper side in the figure is a side that is close to the heating target, and the lower side in the figure is a side that is away from the heating target.

It is preferable that the topsheet 5 and the backsheet 6 are joined to each other via an adhesive 7, such as a hot-melt adhesive, in a state in which the two sheets are laid one on top of the other.

A plurality of heat generating elements spaced apart from each other may be held between the two sheets 5 and 6, and in the example shown, two heat generating elements 3 are arranged spaced apart from each other in the longitudinal direction X.

It is preferable that surfaces CS of the backsheet 6 that are planned to oppose the respective heat generating elements 3 each include a region in which the adhesive 7 is not arranged and a region in which the adhesive 7 is arranged.

In the region in which the adhesive 7 is not arranged, the backsheet 6 is not bonded to the heat generating element 3.

A configuration may also be adopted in which the planned opposing surfaces CS each consist of a region in which the adhesive 7 is arranged, and the adhesive 7 is arranged over the entire region of the backsheet 6 including the entire regions of the planned opposing surfaces CS.

Each heat generating element 3 is typically formed by a heat generating portion 3a that can generate steam as a result of generating heat being accommodated in a cover material 3A.

The cover material 3A has a flat shape, with one side constituted by a first sheet 3f and the other side constituted by a second sheet 3g. From the viewpoint of facilitating the control of heat generation by the heat generating portion 3a, one of the two sheets is preferably an air-permeable sheet, and the other sheet is preferably a non-air-permeable sheet. Details of the first sheet 3f and the second sheet 3g will be described later.

In the following description, unless otherwise specified, as a preferred form of the cover material 3A, a form in which the first sheet 3f is an air-permeable sheet and the second sheet 3g is a non-air-permeable sheet will be described by way of example. That is to say, in this specification, the air-permeable sheet 3f can be read as the "first sheet 3f" when appropriate, and the non-air-permeable sheet 3g can be read as the "second sheet 3g" when appropriate.

As described above, it is preferable that the cover material 3A has a flat shape, with one side constituted by the air-permeable sheet 3f and the other side constituted by the non-air-permeable sheet 3g.

In other words, the heat generating element 3 is typically formed by the heat generating portion 3a being sandwiched between the air-permeable sheet 3f and the non-air-permeable sheet 3g. Preferably, the heat generating portion 3a is in direct contact with the air-permeable sheet 3f and the non-air-permeable sheet 3g.

The heat generating portion 3a accommodated in the cover material 3A also has a flat shape as well.

FIGS. 3(a) and 3(b) show examples of a state in which the heat generating element 3 is fixed.

It is preferable that, in the cover material 3A, a peripheral edge joined portion 35 is continuously formed in which peripheral edge portions of the air-permeable sheet 3f and the non-air-permeable sheet 3g are joined to each other. With this configuration, the air-permeable sheet 3f and the non-air-permeable sheet 3g are not joined to each other in a portion inward of the peripheral edge joined portion 35, and a bag-like cover material 3A is thus formed. The heat generating portion 3a is accommodated in the portion of the cover material 3A that is located inward of the peripheral edge joined portion 35, and therefore, an outer peripheral edge of the heat generating portion 3a in a plan view is located inward of an outer peripheral edge of the heat generating element 3 in a plan view.

The heat generating element 3 is preferably arranged such that the air-permeable sheet 3f and the topsheet 5 oppose each other, or more preferably, the air-permeable sheet 3f and the topsheet 5 are adjacent to each other.

Moreover, the heat generating element 3 is preferably arranged such that the non-air-permeable sheet 3g and the backsheet 6 oppose each other, or more preferably, the non-air-permeable sheet 3g and the backsheet 6 are adjacent to each other.

Here, being adjacent to each other means that two sheets are located next to each other without any other sheet provided therebetween, and the presence of an adhesive and a perfume between the two sheets is allowable.

Note that, in portions (e.g., a middle portion in the longitudinal direction X) in which the topsheet 5 and the backsheet 6 are in direct contact with each other in FIGS. 3(a) and 3(b), the sheets 5 and 6 are joined to each other via the adhesive 7 as shown in FIGS. 2(a) and 2(b), but the adhesive 7 in those portions is not shown in FIGS. 3(a) and 3(b) for the sake of convenience of description.

Typically, the non-air-permeable sheet 3g constituting an outer surface of the cover material 3A of the heat generating element 3 and an inner surface of the backsheet 6 of the warming tool 1 are joined to each other via the adhesive 7. That is to say, the adhesive 7 for bonding the non-air-permeable sheet 3g and the backsheet 6 to each other is arranged between these sheets 3g and 6.

As a form in which the sheets 3g and 6 are joined to each other, a form may be adopted in which opposing surfaces of the sheets 3g and 6 are partially joined to each other via the adhesive 7, and the other surfaces are not fixed to the backsheet 6. Furthermore, the adhesive 7 may be provided in a middle region of the warming tool 1 in the longitudinal direction X thereof and extend in the length direction Y of the warming tool 1. FIG. 3(a) shows this example.

Alternatively, the entire opposing surfaces of the sheets 3g and 6 may be joined to each other via the adhesive 7. FIG. 3(b) shows this example.

As used herein, the "middle region in the longitudinal direction X" means a region that is located in the middle when the total length of a member in the longitudinal direction X is divided into three equal regions.

The heat generating portion 3a constituting the heat generating element 3 is configured to generate steam heated to a predetermined temperature, as a result of generating heat due to an oxidation reaction with oxygen in air.

More specifically, the heat generating portion 3a includes an oxidizable metal that causes heat generation due to an oxidation reaction with oxygen in air, and activated carbon, and also includes an electrolyte and water as necessary.

It is preferable that a perfume 8 is added to the warming tool 1. Preferably, the perfume 8 is arranged between the non-air-permeable sheet 3g and the backsheet 6. Preferably, the non-air-permeable sheet 3g and the backsheet 6 are adjacent to each other, without a sheet, such as paper, impregnated with the perfume beforehand being arranged between the non-air-permeable sheet 3g and the backsheet 6.

Preferably, there is a portion in which the perfume 8 is added between the non-air-permeable sheet 3g and the backsheet 6 without any other member, such as a sheet or an adhesive, provided between the perfume 8 and each sheet. FIG. 3(a) shows an example in which the entirety of the perfume 8 is added without an adhesive provided between the perfume 8 and each sheet.

Preferably, there is a portion in which the perfume 8 is added between the non-air-permeable sheet 3g and the backsheet 6 via the adhesive 7. FIG. 3(b) shows an example in which the entirety of the perfume 8 is added via the adhesive.

In the embodiments shown in FIGS. 3(a) and 3(b), a region in which the adhesive 7 is arranged and a region in which the perfume is not arranged overlap each other in a plan view.

In FIGS. 3(a) and 3(b), for the sake of convenience of description, the perfume 8 is shown having a certain thickness; however, the perfume 8 in actual products substantially does not have a thickness.

In the case where the warming tool 1 is an eye mask, the ear strap portions 4 are typically made of a sheet material, and insertion portions 4A extending in the longitudinal direction X are formed in the sheet material.

The insertion portions 4A are holes or penetrating slits through which the ears are passed when putting the ear strap portions 4 around the ears. In two outer end regions in the longitudinal direction X, the ear strap portions 4 can be joined to an outer surface of the topsheet 5 of the main body portion 2 through heat-sealing, embossing, or the like, and joined regions 9 in which the topsheet 5 is joined to the ear strap portions 4 are thus formed.

The joined regions 9 also function as bending portions when turning over the ear strap portions 4 outward in the longitudinal direction X around respective joined end portions 9s. Thus, a state in which the eyes of the user are covered by the main body portion 2 can be maintained by putting the ear strap portions 4 around the respective ears of the user.

The joined regions 9 may be formed through continuous joining or intermittent joining.

FIGS. 2(a) and 2(b) show these examples.

The arrangement positions of the heat generating element 3, the heat generating portion 3a, the adhesive 7, and the perfume 8 in the warming tool 1 will be described in detail below.

It should be noted that those points that are not elaborated regarding the present embodiment are similar to those of the above-described embodiment, and the descriptions of the above-described embodiment are applied to such points as appropriate.

In the following description, the surface CS that is planned to oppose the heat generating element 3 will also be referred to as "first planned opposing surface CS", and a surface CS2 that is planned to oppose the heat generating portion 3a will also be referred to as "second planned opposing surface CS2".

The surface CS that is planned to oppose the heat generating element 3 is synonymous with an arrangement region of the heat generating element 3, and the surface CS2 that is planned to oppose the heat generating portion 3*a* is synonymous with an arrangement region of the heat generating portion 3*a*.

Figure 4A:
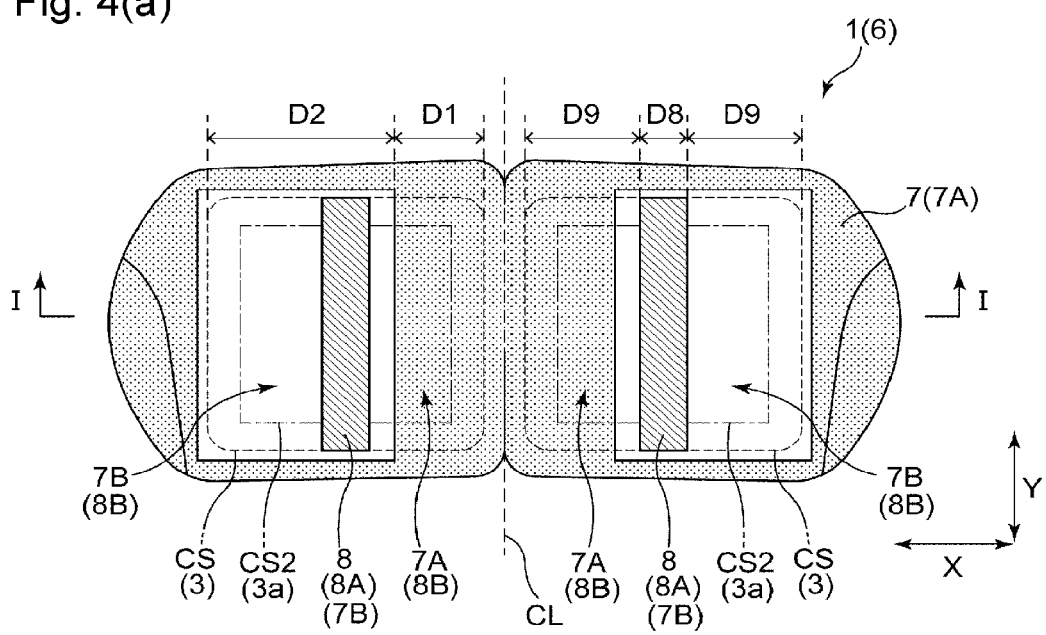
FIG. 4(a) is a plan view schematically showing an embodiment regarding the arrangement positions of a heat generating element, an adhesive, and a perfume included in a warming tool.
Figure 4B:
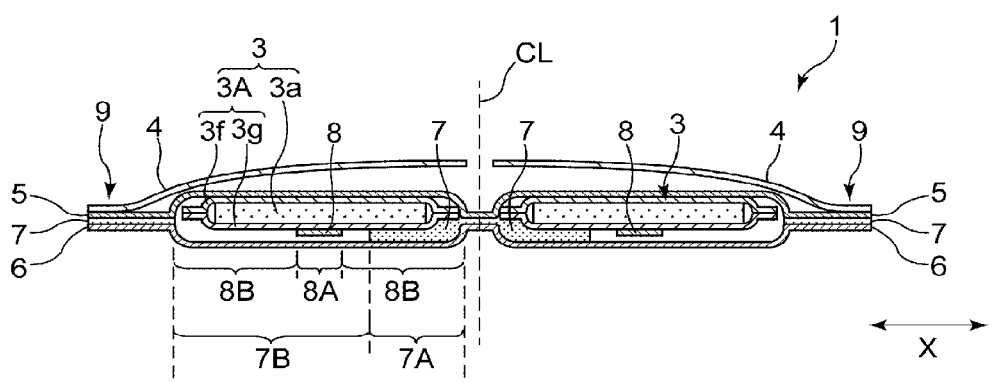
FIG. 4(b) is a schematic cross-sectional view of a warming tool corresponding to the form shown in FIG. 4(a), taken along line I-I.

In the warming tool 1, it is preferable that the perfume 8 and the adhesive 7 for bonding the non-air-permeable sheet 3*g* and the backsheet 6 to each other are arranged between the non-air-permeable sheet 3*g* and the backsheet 6. FIG. 4(*a*) schematically shows a plan view of the warming tool 1 of this example. In FIG. 4(*a*), for the sake of convenience of description, only the arrangement positions of the adhesive 7, the arrangement positions of the perfume 8, the surfaces CS that are planned to oppose the respective heat generating elements 3, and the surfaces CS2 that are planned to oppose the respective heat generating portions 3*a* are shown, and the other constituent members are not shown.

It is preferable that the perfume 8 is arranged preferably on the non-air-permeable sheet 3*g* side of each heat generating element 3. This example is schematically shown in FIG. 4(*b*), which is a cross-sectional view of the warming tool 1 corresponding to the form in FIG. 4(*a*), taken along line I-I, which extends in the longitudinal direction X.

The adhesive 7 is arranged in a partial region of each planned opposing surface CS and may also be arranged over the entire outer region that is located outside the planned opposing surfaces CS. Via the adhesive 7 located on each planned opposing surface CS, the non-air-permeable sheet 3*g* and the backsheet 6 are bonded to each other.

As described above, typically, each heat generating portion 3*a* is accommodated in the portion that is located inward of the peripheral edge joined portion 35 of the cover material 3A constituting the outer surface of the heat generating element 3, and therefore, the first planned opposing surface CS contains the second planned opposing surface CS2. Moreover, the plane area of the first planned opposing surface CS is larger than the plane area of the second planned opposing surface CS2.

It is preferable that the warming tool 1 has, in a plan view thereof, a region (hereinafter also referred to as "adhesive-arranged region") 7A in which the adhesive 7 is arranged and a region (hereinafter also referred to as "non-adhesive-arranged region") 7B in which the adhesive 7 is not arranged. In the embodiment shown in FIG. 4(*a*), an adhesive-arranged region 7A is formed continuously around two non-adhesive-arranged regions 7B having a rectangular shape in a plan view. The non-adhesive-arranged regions 7B of the present embodiment do not extend to two end portions of the warming tool 1 in the length direction Y.

Similarly, it is preferable that the warming tool 1 has, in a plan view thereof, a region (hereinafter also referred to as "perfume-arranged region") 8A in which the perfume 8 is arranged and a region (hereinafter also referred to as "non-perfume-arranged region") 8B in which the perfume 8 is not arranged. In the embodiment shown in FIG. 4(*a*), perfume-arranged regions 8A are strip-like regions extending in the length direction Y in a plan view and are arranged in a middle region of the respective heat generating elements 3 in the longitudinal direction X. In the present embodiment, the perfume-arranged regions 8A do not extend to the two end portions of the warming tool 1 in the length direction Y.

With regard to the relationship between the arrangement positions of the adhesive 7 and the perfume 8, it is preferable that, in a plan view, an adhesive-arranged region 7A and a non-perfume-arranged region 8B overlap each other. With this configuration, a reduction in adhesion of the adhesive due to the perfume can be prevented, and a sufficient joining strength can be realized between the constituent members of the warming tool 1. Moreover, during use of the warming tool 1, a good fragrance from the perfume can be emitted, and the feel of the warming tool during use can be improved.

It is preferable that, in a plan view of the warming tool 1, an adhesive-arranged region 7A overlaps the arrangement region of the heat generating portion 3*a*. In other words, it is preferable that, in a plan view of the warming tool 1, an adhesive-arranged region 7A overlaps the second planned opposing surface CS2. With this configuration, while a sufficient joining strength between the constituent members of the warming tool 1 can be realized, gentle heat generated from the heat generating element 3 facilitates the perfume to volatilize into the surrounding environment of the warming tool 1. As a result, during use of the warming tool 1, a good fragrance from the perfume can be efficiently emitted, and the user can thus made to perceive pleasant warmth and scent.

In the warming tool 1, it is preferable that the arrangement region of the heat generating portion 3*a*, that is, the second planned opposing surface CS2 partially overlaps an adhesive-arranged region 7A, and the other region of the second planned opposing surface CS2 overlaps a non-adhesive-arranged region 7B. Having the non-adhesive-arranged region 7B in this form makes it possible to improve the flexibility and stretchability of the warming tool 1 in the non-adhesive-arranged region 7B while fixing the heat generating element 3 to a desired position via the adhesive 7 in the adhesive-arranged region 7A, and therefore, during use, the warming tool 1 easily conforms to the surface structure of the heating target, thereby having the advantage of improving the fit to the user.

It is preferable that, in a plan view of the warming tool 1, an adhesive-arranged region 7A overlaps the arrangement region of the heat generating element 3. In other words, it is preferable that, in a plan view of the warming tool 1, an adhesive-arranged region 7A overlaps the first planned opposing surface CS. With this configuration, while a sufficient joining strength between the constituent members of the warming tool 1 can be realized, the heat generating element 3 can be fixed to a desired position. Therefore, steam can be easily applied to the heating target, and pleasant warmth can be transmitted to the user.

It is preferable that, in a plan view of the warming tool 1, a perfume-arranged region 8A overlaps the arrangement region of the heat generating element 3. In other words, it is preferable that, in a plan view of the warming tool 1, a perfume-arranged region 8A overlaps the first planned opposing surface CS. With this configuration, even in the case where the adhesive is arranged in the perfume-arranged region 8A, the heat generating element 3 in this region easily separate from the topsheet 5 or the backsheet 6, and thus, an even better fit can be achieved.

From the viewpoint of more markedly obtaining this effect, it is preferable that the perfume 8 is arranged on the non-air-permeable sheet 3*g* side of the heat generating element 3, which is the side close to the heat generating element 3.

From the viewpoint of even more efficiently emitting a good fragrance during use of the warming tool 1 and thereby improving the feel during use even more, it is more preferable that, in a plan view of the warming tool 1, the perfume-arranged region 8A is located only in the first planned opposing surface CS.

From a similar viewpoint, it is more preferable that the perfume-arranged region 8A overlaps the second planned opposing surface CS2.

Figure 5A:
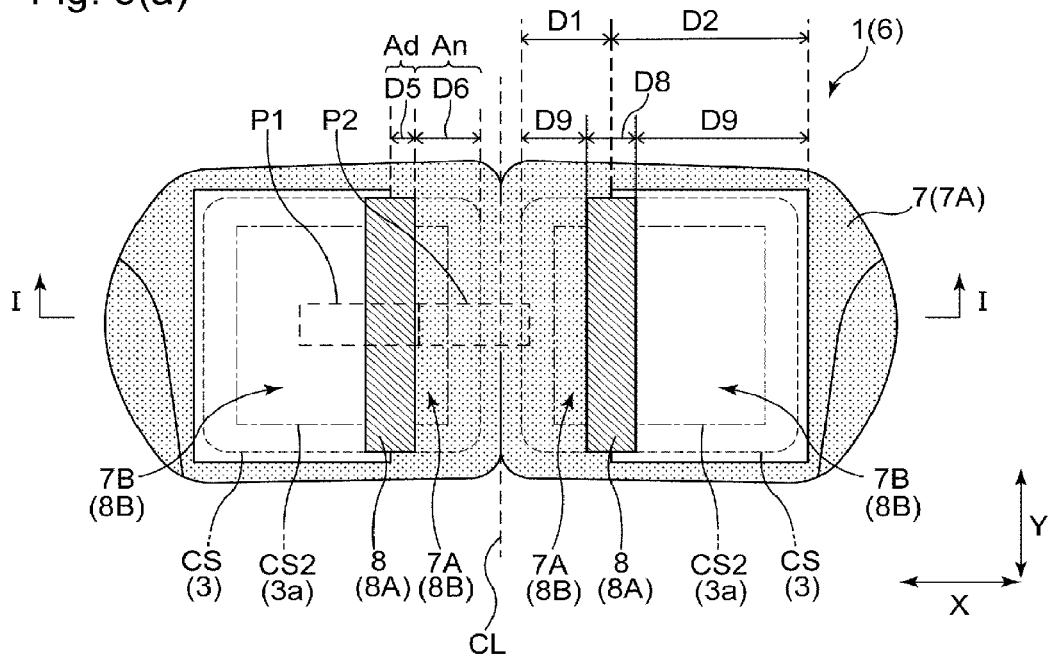
FIG. 5(a) is a plan view schematically showing another embodiment regarding the arrangement positions of a heat generating element, an adhesive, and a perfume included in a warming tool.
Figure 5B:
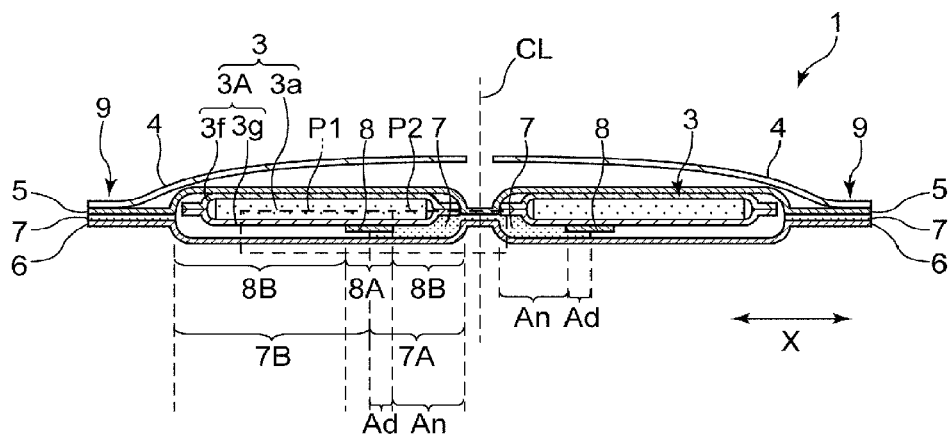
FIG. 5(b) is a schematic cross-sectional view of a warming tool corresponding to the form shown in FIG. 5(a), taken along line I-I.

It is preferable that, in a plan view of the warming tool 1, the arrangement region of the heat generating element 3, that is, the first planned opposing surface CS has an overlapping region Ad in which an adhesive-arranged region 7A and a perfume-arranged region 8A overlap each other. FIG. 5(a) schematically shows a plan view of the warming tool 1 of this example, and FIG. 5(b) schematically shows a cross-sectional view of the warming tool 1 taken along line I-I extending in the longitudinal direction X in FIG. 5(a). The overlapping region Ad is a region in which both the adhesive 7 and the perfume 8 are arranged in a plan view of the warming tool 1, and is formed in a strip-like form along the length direction Y in the example shown.

It is preferable that, in a plan view of the warming tool 1, the first planned opposing surface CS has a non-overlapping region An in which an adhesive-arranged region 7A and a non-perfume-arranged region 8B overlap each other. The non-overlapping region An is a region in which the adhesive 7 is arranged but the perfume 8 is not arranged in a plan view of the warming tool 1, and is formed in a strip-like form along the length direction Y in the example shown.

It is preferable that the non-overlapping region An is located closer to a middle portion of the warming tool 1 in the longitudinal direction X than the position of the overlapping region Ad.

As described above, the non-air-permeable sheet 3g and the backsheet 6 are bonded to each other via the adhesive 7 that is present on the first planned opposing surface CS, and it is preferable that the peeling strength between the non-air-permeable sheet 3g and the backsheet 6 in the overlapping region Ad is different from that in the non-overlapping region An.

More specifically, it is preferable that the peeling strength between the non-air-permeable sheet 3g and the backsheet 6 in the non-overlapping region An is higher than the peeling strength between the non-air-permeable sheet 3g and the backsheet 6 in the overlapping region Ad.

In the overlapping region Ad, in which both the adhesive 7 and the perfume 8 are present, typically, the adhesion between the non-air-permeable sheet 3g and the backsheet 8 may be reduced due to the presence of the perfume.

During use of the warming tool 1, an external force is applied to the warming tool 1 when it is stretched, for example, in the longitudinal direction X. At this time, in the overlapping region Ad, the non-air-permeable sheet 3g of the heat generating element 3 and the backsheet 6 peel off from each other to an appropriate extent, and thus, the conformability and fit to the heating target can be improved. This effect can be realized even more markedly by, for example, using an aqueous adhesive, which will be described later, as the adhesive 7.

In the non-overlapping region An, even when an external force is applied, a sufficient joining strength between the backsheet 6 and the non-air-permeable sheet 3g of the heat generating element 3 can be realized. In addition, since the heat generating element 3 can be fixed to a desired position, steam can be easily applied to the heating target, thereby making the user perceive pleasant warmth.

The peeling strength can be measured using the following method.

First, the adhesive is solidified by spraying a cold spray onto the warming tool, and the topsheet 5, the air-permeable sheet 3f, and the heat generating portion 3a are removed by carefully peeling off these members by hand. Then, a stack of the non-air-permeable sheet 3g and the backsheet 6 is collected, and whether or not an overlapping region Ad and a non-overlapping region An are present is judged. Whether or not an overlapping region Ad and a non-overlapping region An are present can be judged based on the UV absorbance obtained by irradiating the outer surface side of the backsheet 6 with black light. A region having a high absorbance is judged as an overlapping region Ad, and a region having a low absorbance is judged as a non-overlapping region An.

Figure 6A:
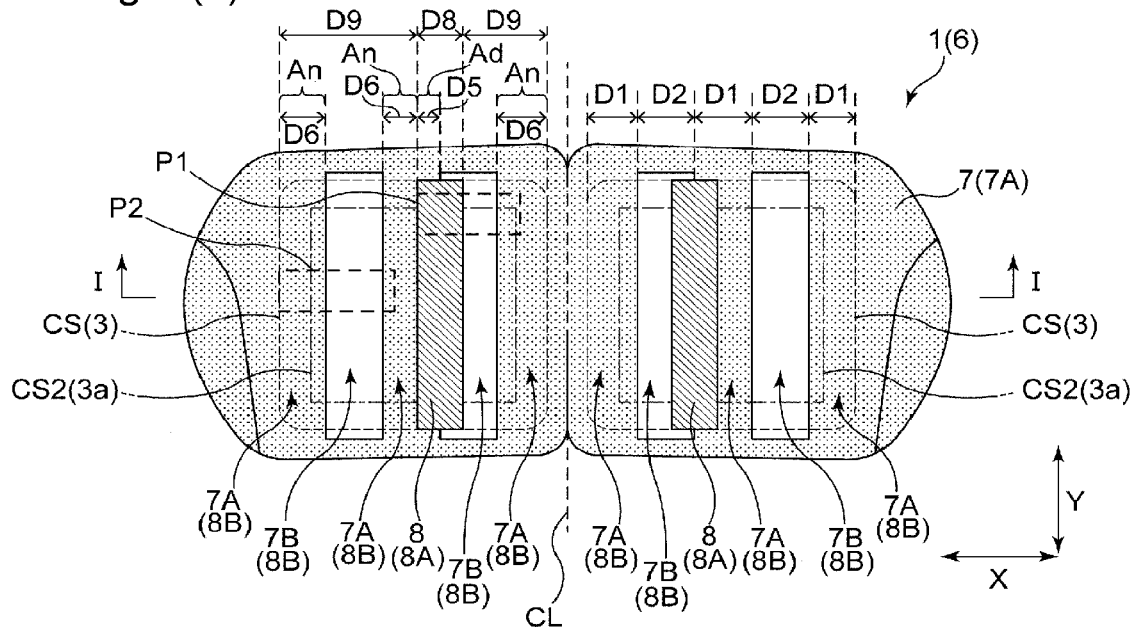
FIG. 6(a) is a plan view schematically showing yet another embodiment regarding the arrangement positions of a heat generating element, an adhesive, and a perfume included in a warming tool.

Then, a measurement piece with a size of 30 mm in the longitudinal direction X and 15 mm in the length direction Y is cut out from the stack of the non-air-permeable sheet 3g and the backsheet 6 through punching using a Thomson blade so that the obtained measurement piece contains an overlapping region Ad or a non-overlapping region An. With regard to the position from which the measurement piece is cut out, when FIGS. 5(a) and 6(a) are taken as examples, a measurement piece at a position P1 can be obtained as a measurement piece containing an overlapping region Ad, and a measurement piece at a position P2 can be obtained as a measurement piece containing a non-overlapping region An; however, the position from which the measurement piece is cut out is not limited to these positions.

If a measurement piece containing an overlapping region Ad contains a non-overlapping region An, the effect of joining in the non-overlapping region An contained in the measurement piece containing the overlapping region Ad is eliminated beforehand by, for example, melting the adhesive in the non-overlapping region An contained in the measurement piece containing the overlapping region Ad, or peeling off the non-overlapping region An by hand. Similarly, if a measurement piece containing a non-overlapping region An contains an overlapping region Ad, the effect of joining in the overlapping region Ad contained in the measurement piece containing the overlapping region Ad is eliminated beforehand by, for example, melting the adhesive in the overlapping region Ad contained in the measurement piece containing the non-overlapping region An, or peeling off the overlapping region Ad by hand.

Subsequently, the non-air-permeable sheet 3g side of the measurement piece is fixed to one of the chucks of a TENSILON universal testing instrument RTG1310 (A&D Company, Limited), and the backsheet 6 side of the measurement piece is fixed to the other chuck. Thus, the measurement piece is attached between these chucks. The inter-chuck distance is set to 20 mm. Then, the chuck is moved in a direction of 180° at a rate of 300 mm/min to peel the non-air-permeable sheet 3g and the backsheet 6 from each other. The maximum value (N) of the force observed during this process is measured. This measurement is repeated five times for each of five warming tools, with one sample collected from one warming tool, and the arithmetic mean value of the five measurement values for each warming tool is used as the peeling strength (N) in the relevant region.

From the viewpoint of improving the conformability and fit, the peeling strength (A) between the non-air-permeable sheet 3g and the backsheet 6 in the overlapping region Ad is preferably 0.1 N or greater.

From the viewpoint of suppressing displacement of the heat generating element 3 within a packaging pillow, the peeling strength (A) between the non-air-permeable sheet 3g and the backsheet 6 in the overlapping region Ad is preferably 2 N or less.

From the viewpoint of fixing the heat generating element 3 to a desired position and thereby efficiently applying gentle heat to the heating target, the peeling strength (B) between the non-air-permeable sheet 3g and the backsheet 6 in the non-overlapping region An is preferably 2 N or greater.

From the viewpoint of minimizing the areal weight of the adhesive 7, the peeling strength (B) between the non-air-permeable sheet 3g and the backsheet 6 in the non-overlapping region An is preferably 8 N or less.

From the viewpoint of improving the fit of the warming tool when worn, the difference (B−A) between the peeling strength (B) between the non-air-permeable sheet 3g and the backsheet 6 in the non-overlapping region An and the peeling strength (A) between the non-air-permeable sheet 3g and the backsheet 6 in the overlapping region Ad is preferably 1.5 N or greater.

From the viewpoint of reducing the manufacturing cost by reducing the amount of the adhesive 7 that is used, the difference (B−A) is preferably 10 N or less.

From the viewpoint of improving the fit of the warming tool when worn, the ratio (A/B) of the peeling strength (A) between the non-air-permeable sheet 3g and the backsheet 6 in the overlapping region Ad to the peeling strength (B) between the non-air-permeable sheet 3g and the backsheet 6 in the non-overlapping region An is preferably 0.01 or greater.

From the viewpoint of reducing the manufacturing cost by reducing the amount of the adhesive 7 that is used, the ratio (A/B) is preferably 0.3 or less.

The form in which an adhesive-arranged region 7A and a non-adhesive-arranged region 7B are arranged in the warming tool 1 when viewed along the longitudinal direction X may be different from those of the above-described embodiments.

For example, a configuration is preferable in which, on the first planned opposing surface CS, which is the arrangement region of the heat generating element 3 in a plan view, adhesive-arranged regions 7A and non-adhesive-arranged regions 7B are alternately arranged in the longitudinal direction X. With this configuration, flexible axes extending in the length direction Y can be easily formed by the non-adhesive-arranged regions 7B while the heat generating element 3 can be sufficiently fixed to a desired position, and thus, both the application of sufficient gentle heat to the heating target and the fit can be improved.

Figure 6B:
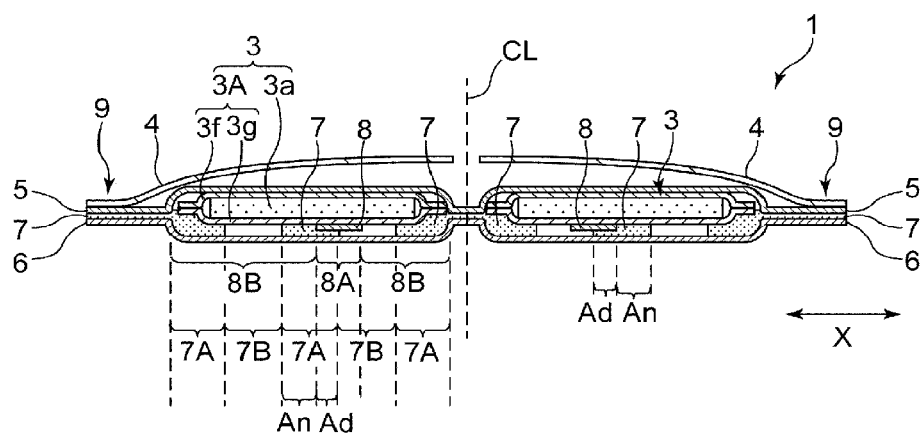
FIG. 6(b) is a schematic cross-sectional view of a warming tool corresponding to the form shown in FIG. 6(a), taken along line I-I.

In the warming tool 1, it is preferable that a plurality of non-adhesive-arranged regions 7B are formed in a strip-like form and individually extend in the length direction Y. It is preferable that, in a plan view, a plurality of non-adhesive-arranged regions 7B are arranged in the first planned opposing surface CS, via a strip-like adhesive-arranged region 7A arranged in a middle region of the first planned opposing surface CS in the longitudinal direction X. FIG. 6(a) schematically shows a plan view of the warming tool 1 of this example, and FIG. 6(b) schematically shows a cross-sectional view of the warming tool 1 taken along line I-I extending in the longitudinal direction X in FIG. 6(a). In the present embodiment, none of the non-adhesive-arranged regions 7B extend to the two end portions in the length direction Y.

It is preferable that perfume-arranged regions 8A that are strip-like regions extending in the length direction Y in a plan view are arranged in a middle region of the respective heat generating elements 3 in the longitudinal direction X. The perfume-arranged regions 8A of the example shown do not extend to the two end portions of the warming tool 1 in the length direction Y.

It is preferable that, in the warming tool 1, the first planned opposing surface CS has an overlapping region Ad and a non-overlapping region An, and, preferably, the overlapping region Ad is formed in a strip-like form and extends in the length direction Y.

It is preferable that a plurality of non-overlapping regions An are formed. In the example shown, a non-overlapping region An is located closer to the middle portion of the warming tool 1 in the longitudinal direction X with respect to the position of the overlapping region Ad in a plan view. In addition, a non-overlapping region An is located outward of the overlapping region Ad in the longitudinal direction X of the warming tool 1.

Furthermore, it is preferable that, in a plan view, the first planned opposing surface CS has a region in which a non-adhesive-arranged region 7B and a perfume-arranged region 8A overlap each other, and a region in which a non-adhesive-arranged region 7B and a non-perfume-arranged region 8B overlap each other.

Figure 7:
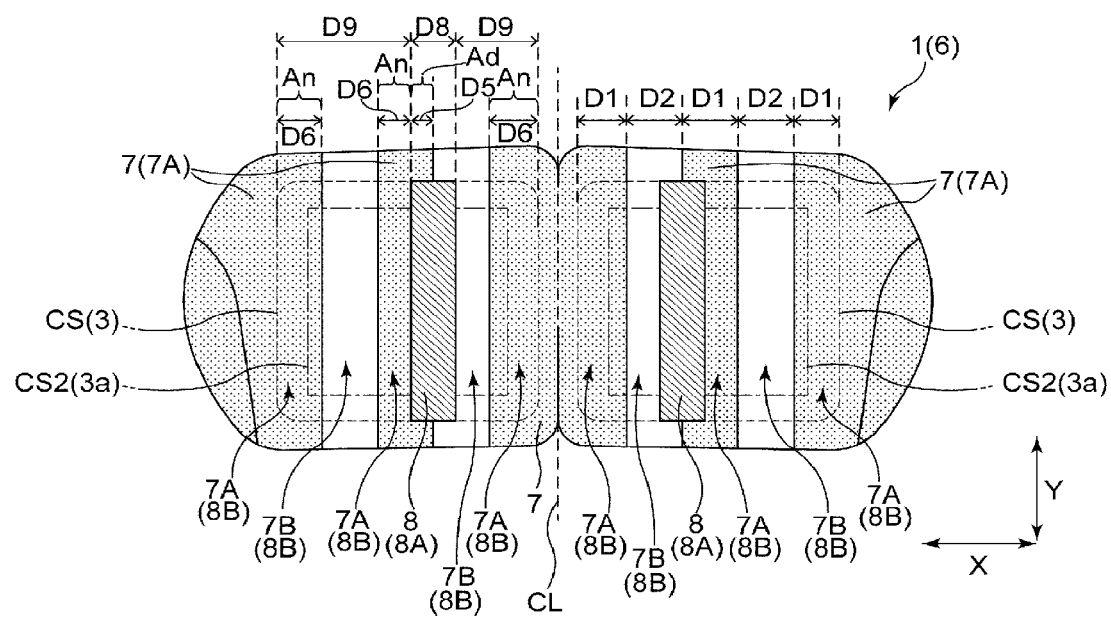
FIG. 7 is a plan view schematically showing yet another embodiment regarding the arrangement positions of a heat generating element, an adhesive, and a perfume included in a warming tool.

In the warming tool 1, it is preferable that each non-adhesive-arranged region 7B extends to the two end portions of the warming tool 1 in the length direction Y. With this configuration, the non-adhesive-arranged region 7B serves as a flow channel for gentle heat generated from the heat generating element 3, and therefore, the perfume that has been volatilized by gentle heat can move in the direction in which the non-adhesive-arranged region 7B extends. As a result, during use of the warming tool 1, a good fragrance can be efficiently perceived by the user, and the feel during use can thus be improved even more. FIG. 7 schematically shows a plan view of the warming tool 1 of this example.

In the case where an adhesive-arranged region 7A overlaps the arrangement region of the heat generating element 3 or the heat generating portion 3a, it is preferable that the adhesive-arranged region 7A located in the first planned opposing surface CS or the second planned opposing surface CS2 is formed at least in the middle region of the warming tool 1 in the longitudinal direction X. With this configuration, when applying gentle heat generated from the heat generating elements 3 to the heating target, the distance from the heat generating elements 3 to the heating target during use of the warming tool 1 can be made uniform, and an unevenness of application of gentle heat to the heating target can thus be reduced. As a result, the user of the warming tool can uniformly perceive pleasant warmth.

It is preferable that at least one of the adhesive-arranged regions 7A, the non-adhesive-arranged regions 7B, the perfume-arranged regions 8A, and the non-perfume-arranged regions 8B are formed to be line symmetrical, where a center line CL extending in the length direction Y while dividing the warming tool 1 into two equal parts is the axis of symmetry, and it is more preferable that all of these types of regions are formed to be line symmetrical, where the center line CL is the axis of symmetry.

In the case where all of the adhesive-arranged regions 7A, the non-adhesive-arranged regions 7B, the perfume-arranged regions 8A, and the non-perfume-arranged regions 8B are formed to be line symmetrical, where the center line CL is the axis of symmetry, the overlapping regions Ad and the non-overlapping regions An are also formed to be line symmetrical, where the center line CL is the axis of symmetry.

With this configuration, the distance from the heat generating elements 3 to the heating target during use of the warming tool 1 can be made uniform, and an unevenness of application of the heat to the heating target can thus be reduced. As a result, the user of the warming tool can uniformly perceive pleasant warmth. In addition, in the process of manufacturing the warming tool 1, the arrangement positions of the adhesive 7 and the perfume 8 do not need to be changed between one side and the other side of center line CL of the warming tool 1 in the longitudinal direction thereof, and therefore, the warming tool production efficiency improves even more.

From the viewpoint of facilitating the fixation of the heat generating elements 3 to desired positions and thereby effectively applying gentle heat to the heating target, the adhesive-arranged regions 7A located in the first planned opposing surfaces CS each independently have a length D1 of preferably 0.5 mm or greater, more preferably 1.5 mm or greater, and even more preferably 3 mm or greater, in the longitudinal direction X.

From the viewpoint of suppressing displacement of the heat generating elements 3 and thereby allowing gentle heat to be applied to the heating target at appropriate positions, the adhesive-arranged regions 7A located in the first planned opposing surfaces CS each independently have a length D1 of preferably 70 mm or less, more preferably 45 mm or less, and even more preferably 15 mm or less, in the longitudinal direction X.

From the viewpoint of facilitating the fixation of the heat generating elements 3 to desired positions and thereby effectively applying gentle heat to the heating target, the percentages of the above-described lengths D1 with respect to the length (total length) of the warming tool 1 in the longitudinal direction X are, each independently, preferably 3% or greater, more preferably 5% or greater, and even more preferably 10% or greater.

From the viewpoint of suppressing displacement of the heat generating elements 3 and thereby allowing gentle heat to be applied to the heating target at appropriate positions, the percentages of the above-described lengths D1 with respect to the length (total length) of the warming tool 1 in the longitudinal direction X are, each independently, preferably 20% or less, more preferably 15% or less, and even more preferably 13% or less.

From the viewpoint of increasing the flexibility of the warming tool 1 and thereby improving the fit to the heating target even more, the non-adhesive-arranged regions 7B located in the first planned opposing surfaces CS each independently have a length D2 of preferably 0.5 mm or greater, more preferably 3 mm or greater, and even more preferably 5 mm or greater, in the longitudinal direction X.

From the viewpoint of reducing unintentional contamination of the inside of the non-adhesive-arranged regions 7B with foreign matter and thereby maintaining sufficient heat generation characteristics of the heat generating elements 3, the non-adhesive-arranged regions 7B located in the first planned opposing surfaces CS each independently have a length D2 of preferably 70 mm or less, more preferably 15 mm or less, and even more preferably 5 mm or less, in the longitudinal direction X.

From the viewpoint of increasing the flexibility of the warming tool 1 and thereby improving the fit to the heating target even more, the percentages of the above-described lengths D2 with respect to the length (total length) of the warming tool 1 in the longitudinal direction X are, each independently, preferably 10% or greater, more preferably 5% or greater, and even more preferably 3% or greater.

From the viewpoint of reducing unintentional contamination of the inside of the non-adhesive-arranged regions 7B with foreign matter and thereby maintaining sufficient heat generation characteristics of the heat generating elements 3, the percentages of the above-described lengths D2 with respect to the length of the warming tool 1 in the longitudinal direction X are, each independently, preferably 30% or less, more preferably 20% or less, and even more preferably 15% or less.

From the viewpoint of improving the fit, the overlapping regions Ad located in the first planned opposing surfaces CS each have a length D5 of preferably 2 mm or greater, more preferably 4 mm or greater, and even more preferably 6 mm or greater, in the longitudinal direction X.

From the viewpoint of improving the fixation of the heat generating elements 3, the overlapping regions Ad located in the first planned opposing surfaces CS each have a length D5 of preferably 12 mm or less, more preferably 10 mm or less, and even more preferably 8 mm or less, in the longitudinal direction X.

From the viewpoint of improving the fixation of the heat generating elements 3, the non-overlapping regions An located in the first planned opposing surfaces CS each have a length D6 of preferably 2 mm or greater, more preferably 4 mm or greater, and even more preferably 6 mm or greater, in the longitudinal direction X.

From the viewpoint of improving the fit, the non-overlapping regions An located in the first planned opposing surfaces CS each have a length D6 of preferably 12 mm or less, more preferably 10 mm or less, and even more preferably 8 mm or less, in the longitudinal direction X.

In terms of emission of the scent of the perfume, the perfume-arranged regions 8A located in the first planned opposing surfaces CS each independently have a length D8 of preferably 4 mm or greater, more preferably 8 mm or greater, and even more preferably 10 mm or greater, in the longitudinal direction X.

From the viewpoint of optimizing the scent the perfume that is perceived by the user to such an extent that it feels pleasant, the perfume-arranged regions 8A located in the first planned opposing surfaces CS each independently have a length D8 of preferably 24 mm or less, more preferably 20 mm or less, and even more preferably 16 mm or less, in the longitudinal direction X.

From the viewpoint of improving the fit of the warming tool to the heating target when worn, the non-perfume-arranged regions 8B located in the first planned opposing surfaces CS each independently have a length D9 of preferably 3 mm or greater, more preferably 5 mm or greater, and even more preferably 10 mm or greater, in the longitudinal direction X.

From the viewpoint of improving the fixation of the heat generating elements 3, the non-perfume-arranged regions 8B located in the first planned opposing surfaces CS each independently have a length D9 of preferably 25 mm or less, more preferably 20 mm or less, and even more preferably 15 mm or less, in the longitudinal direction X.

As the adhesive 7 that is used in the warming tool 1, aqueous adhesives and organic adhesives can be employed.

Aqueous adhesives are adhesives in which an adhesive component is dissolved in water, or dispersed in water in the form of an O/W emulsion.

Examples of the aqueous adhesives include a vinyl acetate resin-based emulsion-type adhesive, a vinyl acetate copolymer resin-based emulsion-type adhesive, an ethylene-vinyl acetate copolymer resin-based emulsion-type adhesive, an acrylic resin-based emulsion-type adhesive, an aqueous polymer-isocyanate-based adhesive, and a synthetic rubber-based latex-type adhesive. One of these types of adhesives may be used alone, or two or more thereof may be used in combination.

Organic adhesives are adhesives in which an adhesive component is dissolved or dispersed in an organic solvent.

Examples of the organic adhesives include an elastomer-based adhesive, a solvent-type adhesive, and a thermoplastic resin-based adhesive.

Examples of the elastomer-based adhesive include a chloroprene rubber-based adhesive, a nitrile rubber-based adhesive, a styrene-butadiene rubber-based adhesive, a thermoplastic elastomer-based adhesive, a butyl rubber-based adhesive, a silicone-based adhesive, a modified silicone-based adhesive, a silylated urethane-based adhesive, a urethane rubber-based adhesive, a polysulfide-based adhesive, and an acrylic rubber-based adhesive.

Examples of the solvent-type adhesive include a vinyl acetate resin-based solvent-type adhesive and a rubber-based solvent-type adhesive.

Examples of the thermoplastic resin-based adhesive include a vinyl acetate resin-based adhesive, a polyvinyl alcohol-based adhesive, an ethylene vinyl acetate resin-based adhesive, a vinyl chloride resin-based adhesive, an acrylic resin-based adhesive, a polyamide-based adhesive, a cellulose-based adhesive, a polyvinylpyrrolidone-based adhesive, a polystyrene-based adhesive, a cyanoacrylate-based adhesive, and a polyvinyl acetal-based adhesive.

One of these types of adhesives may be used alone, or two or more thereof may be used in combination.

Of the above-described various types of adhesives, it is preferable to use an aqueous adhesive as the adhesive 7, and it is more preferable to use only an aqueous adhesive, from the viewpoint of effectively realizing appropriate peelability between the non-air-permeable sheet 3g and the backsheet 6 in the case where an overlapping region Ad is formed, and thereby improving the conformability and fit to the heating target even more. Typically, as a fragrant component and a solvent constituting the perfume, those which are highly lipophilic are used. Therefore, the use of a combination of the highly lipophilic perfume and an aqueous adhesive, which is highly hydrophilic, is advantageous in that the adhesion of the adhesive 7 in the overlapping region Ad is reduced, and thereby appropriate peelability can be effectively realized.

As the perfume 8 that is used in the warming tool 1, perfumes containing a fragrant component that is volatilizable into the air under atmospheric pressure can be employed. As this fragrant component, fragrant components whose scents are perceivable under a normal-temperature and normal-pressure environment can be employed.

Examples of the fragrant component constituting the perfume include components listed in "Gosei Koryo: Kagaku to Shohin Chishiki" (edited by the Gosei Koryo editorial board, The Chemical Daily Co., Ltd., an enlarged new edition published on Dec. 20, 2016).

Specific examples of the fragrant component include terpene-based hydrocarbons, aldehydes, phenols, and lactones.

Examples of the terpene-based hydrocarbons include myrcene, farnesene, pinene, limonene, camphene, phellandrene, terpinen, terpinolene, p-cymene, cedrene, and caryophyllene.

Examples of the aldehydes include hexyl cinnamic aldehyde, 2-methyl-3-(4-tert-butylphenyl)-propanal, 4-(4-hydroxy-4-methylpentyl)-3-cyclohexene-1-carboxyaldehyde, and vanillin.

Examples of the phenols include aromatic alcohol anethole and eugenol.

Examples of aromatic alcohol anethole or eugenol include benzyl alcohol, phenylethyl alcohol, Pamplefleur (2-methyl-4-phenylpentanol), dimethylbenzylcarbinol, and phenylhexanol (3-methyl-5-phenylpentanol).

Examples of the lactones include γ-nonalactone and γ-undecalactone.

Moreover, the perfume encompasses a "product (perfume composition) obtained by combining perfume materials composed of a plurality of perfumes, and diluted and adjusted using a solvent". For example, perfume compositions having rose-, lavender-, jasmine-, and ilang-ilang-like fragrances can be used as the perfume.

In addition to these, various types of essential oils, which will be described later, can also be used.

It is preferable that the above-described perfume 8 contains a fragrant component that has a terpene in the molecular structure. In other words, it is preferable that the perfume contains a terpene-based hydrocarbon, which has been described above.

The use of such perfume can realize a sufficient adhesive strength between each heat generating element 3 and the backsheet 6 even when both the adhesive and the perfume are used in the overlapping region Ad. This is advantageous in that, in the case where a thermoplastic resin-based adhesive is used as the adhesive 7, a sufficient adhesive strength can be ensured while improving the compatibility with the perfume 8 and enabling a good fragrance from the perfume to be emitted.

Figure 8:
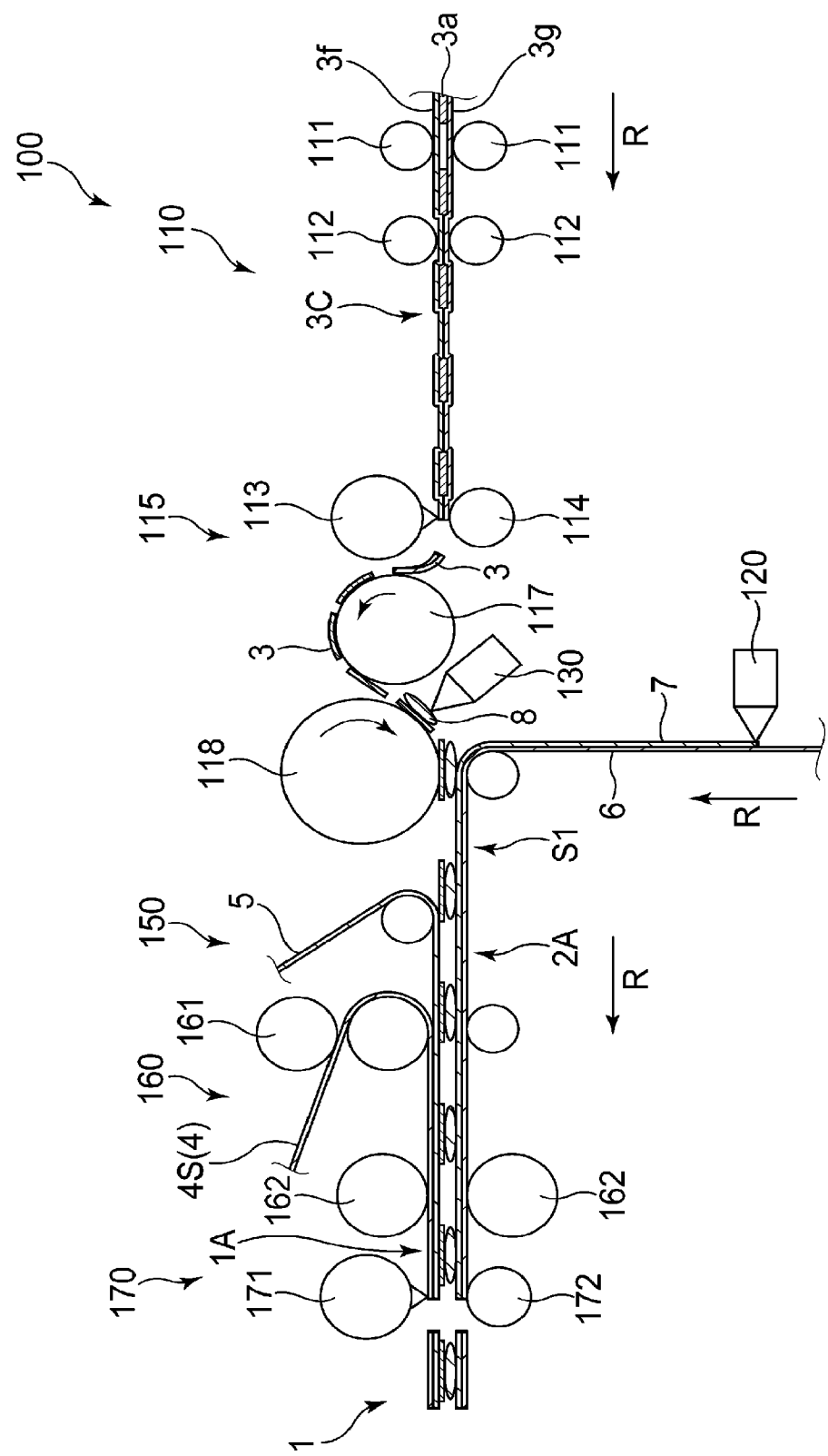
FIG. 8 is a schematic diagram showing an embodiment of a manufacturing apparatus that is used for the manufacturing method of the present invention.

It is preferable that a manufacturing apparatus 100 includes a heat generating element forming unit 110 for forming a heat generating element 3, an adhesive application unit 120 for applying an adhesive 7 to a backsheet 6, a perfume application unit 130 for applying a perfume 8, and a topsheet joining unit 150 for supplying a topsheet 5 and causing the heat generating element 3 to be held. FIG. 8 schematically shows a manufacturing apparatus including these units.

In the heat generating element forming unit 110, preferably, heat generating elements 3 are formed by supplying heat generating portions 3a that have been formed in a process that is not shown between a web of an air-permeable sheet 3f in a long strip-like form and a web of a non-air-permeable sheet 3g in a long strip-like form at predetermined intervals.

It is preferable that the heat generating element forming unit 110 includes a pair of first sealing portions 111 constituted by heat rollers or the like and a pair of second sealing portions 112 constituted by heat rollers or the like.

The sealing portions 111 and 112 of the heat generating element forming unit 110 can form a peripheral edge joined portion 35 in a state in which a heat generating portion 3a is arranged between the air-permeable sheet 3f and the non-air-permeable sheet 3g, the peripheral edge joined portion 35 being formed at an outward extending portion of the outer peripheral edge of the heat generating portion 3a.

Thus, a continuous body 3C (hereinafter also referred to as "continuous heat generating element 3C") of heat generating elements 3 in which heat generating portions 3a are accommodated in respective cover materials 3A constituted by the air-permeable sheet 3f and the non-air-permeable sheet 3g is formed.

It is preferable that a cutter unit 115 in which a cutter roller 113 that has a cutter blade and an anvil roller 114 that opposes the roller 113 are arranged is provided downstream of the sealing portions 111 and 112 in a transporting direction R, and a transfer drum 117 and a repitch drum 118 are provided downstream of the cutter unit 115.

When the continuous heat generating element 3C is supplied between the rollers 113 and 114, the cutter unit 115 can cut the continuous heat generating element 3C at positions between the heat generating portions 3a that are located next to each other in the transporting direction R, thereby forming separate heat generating elements 3.

The transfer drum 117 transports heat generating elements 3 that have been transferred onto a circumferential surface thereof, and further transfers the heat generating elements 3 onto a circumferential surface of the repitch drum 118 that is arranged in close proximity to the transfer drum 117.

The repitch drum 118 is configured to be able to supply the heat generating elements 3 that have been transferred onto the circumferential surface thereof while increasing the distance between the heat generating elements 3 in the transporting direction R.

It is preferable that the adhesive application unit 120 is configured to be able to continuously or intermittently apply the adhesive 7 to one surface of a web of a backsheet 6 in a long strip-like form, the web being transported from a location other than the heat generating element forming unit 110.

It is preferable that the perfume application unit 130 is configured to be able to add the perfume 8 to a constituent member of the warming tool 1 by, for example, spraying or applying the perfume 8.

Preferably, the perfume application unit 130 is provided downstream of the transfer drum 117 in the transporting direction and upstream of the repitch drum 118 in the transporting direction. With this configuration, the perfume can be continuously or intermittently added to the outer surface of the heat generating elements 3 on the non-air-permeable sheet 3g side.

The topsheet joining unit 150 is a unit for forming a continuous main body portion 2A in which heat generating elements 3 are held between the topsheet 5 and the backsheet 6, by supplying a web of the topsheet 5 in the long strip-like form onto a stack S1 in which the heat generating elements 3 are arranged on one surface of the backsheet 6, the web of the topsheet 5 being supplied using a guide roller 151 onto the side of the stack S1 on which the heat generating elements 3 are arranged.

It is preferable that the manufacturing apparatus 100 further includes an ear strap portion forming unit 160. The ear strap portion forming unit 160 is a unit for forming ear strap portions 4 made of a sheet material by supplying a long strip-like ear strap sheet web 4S for forming the ear strap portions 4 onto a surface of the topsheet 5 on the side on which the heat generating elements 3 are not arranged.

It is preferable that the ear strap portion forming unit 160 includes an ear strap cutter unit 161 that has cutter rollers and an ear strap sealing portions 162 constituted by heat rollers or the like. The ear strap cutter unit 161 is a unit for forming insertion portions 4A in the ear strap sheet web 4S that has been supplied thereto, while forming a cutting portion for enabling the ear strap portions 4 to be turned over outward, at a middle portion of the ear strap sheet web 4S in its width direction.

The ear strap sealing portions 162 are portions for forming joined regions 9 by supplying the ear strap sheet web 4S that has passed through the ear strap cutter unit 161 and the continuous main body portion 2A between the sealing portions 162 and joining the topsheet 5 of the continuous main body portion 2A and the ear strap sheet web 4S to each other.

Thus, a continuous body 1A of warming tools 1 in which the ear strap portions 4 are formed in the continuous main body portion 2A is formed.

It is preferable that the manufacturing apparatus 100 further includes a product cutter unit 170. The product cutter unit 170 is constituted by a cutter roller 171 that has a cutter blade and an anvil roller 172 that opposes the roller 171.

The product cutter unit 170 is a unit for manufacturing a warming tool 1 to be manufactured, by supplying the continuous body 1A of the warming tools 1 between these rollers 171 and 172 and thereby cutting the continuous body 1A of the warming tools 1 into pieces of a predetermined size, at positions between the heat generating elements 3 that are located next to each other in the transporting direction R.

It is preferable that, according to a method for manufacturing a warming tool of the present invention, a step (scenting step) of adding a perfume to an outer surface of a non-air-permeable sheet 3g of a heat generating element 3 is performed, and then, a step (holding step) of causing the heat generating element 3 to be held between a topsheet 5 and a backsheet 6, the heat generating element 3 being arranged such that the backsheet 6 and the non-air-permeable sheet 3g oppose each other, is performed.

It is preferable that the present manufacturing method includes a step of forming the heat generating element 3 prior to performing the scenting step. More specifically, it is preferable that heat generating portions 3a in the form of a heat generating sheet or a heat generating composition, which will be described later, are arranged at predetermined intervals between a web of an air-permeable sheet 3f that is transported in the transporting direction R and a web of the non-air-permeable sheet 3g that is transported in the transporting direction R.

It is preferable that, after that, the sealing portions 111 and 112 join the air-permeable sheet 3f and the non-air-permeable sheet 3g to each other in a region which corresponds to an outward extending portion of the outer peripheral edge of a heat generating portion 3a and in which the heat generating portion 3a is not present, thereby forming a peripheral edge joined portion 35.

Thus, a continuous heat generating element 3C in which heat generating portions 3a are accommodated in flat cover materials 3A is produced.

In forming the continuous heat generating element 3C, from the viewpoint of efficiently realizing gentle heat during use of the warming tool 1 to be manufactured, it is preferable to use a heat generating portion 3a that contains an oxidizable metal and activated carbon and can generate steam as a result of generating heat due to oxidation of the oxidizable metal.

From the viewpoint of sufficiently bringing heated steam into contact with the user during use of the warming tool 1 to be manufactured and thereby effectively applying gentle heat, it is also preferable to use an air-permeable sheet 3f that is moisture-permeable.

In the present manufacturing method, it is preferable that the continuous heat generating element 3C that has been formed as described above is cut at positions between the heat generating portions 3a that are located next to each other in the transporting direction R, to thereby form separate heat generating elements 3. The divided heat generating elements 3 are transported while being transferred onto the circumferential surfaces of the transfer drum 117 and the repitch drum 118.

Preferably, at this time, while the divided individual heat generating elements 3 are transported in the transporting direction R, the scenting step is performed by the perfume application unit 130, which is provided downstream of the transfer drum 117 in the transporting direction and upstream of the repitch drum 118 in the transporting direction, continuously or intermittently adding the perfume 8 to outer surfaces on non-air-permeable sheet 3g side of the heat generating elements 3 transferred onto the circumferential surface of the repitch drum 118.

After that, the heat generating elements 3 to which the perfume 8 has been added are supplied onto the backsheet 6 via the repitch drum 118. In the present embodiment, the surfaces of the heat generating elements 3 to which the perfume is added are located on a side that does not face the circumferential surface of the repitch drum 118, and therefore, the heat generating elements 3 can be advantageously scented and transported in such a manner that the perfume 8 does not adhere to the repitch drum 118 and the like of the manufacturing apparatus 100, and contamination of the manufacturing apparatus can thus be reduced even further.

Furthermore, it is preferable that the heat generating elements 3 that are transported via the repitch drum 118 are, in the steps thereafter, supplied and arranged such that the surfaces of the heat generating elements 3 to which the perfume 8 has been added oppose the backsheet 6. Therefore, even when the scented heat generating elements 3 are subjected to the steps thereafter, the heat generating elements 3 can be transported with their surfaces to which the perfume 8 has been added being prevented from coming into contact with transporting means such as a conveyor and rollers included in the manufacturing apparatus 100, and accordingly, contamination of the manufacturing apparatus can be reduced even further.

In the present manufacturing method, it is preferable that, separately from the scenting step, the backsheet 6 is transported in the transporting direction R while the adhesive application unit 120 continuously or intermittently applies the adhesive 7 to one surface of the web of the backsheet 6. From the viewpoint of successfully arranging each heat generating element 3 at a predetermined position, the adhesive 7 is preferably applied to a portion, or the entire region, of the surface CS of the backsheet 6 that is planned to oppose the heat generating element 3, and is more preferably applied to a portion of the surface CS of the backsheet 6 that is planned to oppose the heat generating element 3.

In particular, having the adhesive 7 applied to a portion of the planned opposing surface CS makes it possible to improve the flexibility in a region where the adhesive 7 is not applied, while fixing the heat generating element 3 to a desired position via the adhesive 7 in a region where the adhesive 7 is applied, and thus, also has the advantage of improving the fit of the warming tool 1 to be obtained the user during use.

Next, it is preferable that, onto the surface of the transported backsheet 6 to which the adhesive 7 has been applied, the heat generating elements 3 to which the perfume 8 has been added are arranged at predetermined intervals via the repitch drum 118.

At this time, it is preferable that the heat generating elements 3 are arranged onto the backsheet 6 such that the surface of the backsheet 6 to which the adhesive 7 has been applied and the non-air-permeable sheet 3g of the heat generating elements 3 oppose each other. In other words, in the present embodiment, it is preferable that the heat generating elements 3 are arranged such that their surface to which the perfume 8 has been applied and the surface of the backsheet 6 to which the adhesive 7 has been applied oppose each other. Thus, a stack S1 in which the heat generating elements 3 are arranged on one surface of the backsheet 6 is formed.

Subsequently, it is preferable that, in the topsheet joining unit 150, the web of the topsheet 5 is supplied to the air-permeable sheet 3f side of the heat generating elements 3 in the stack S1 to cause the heat generating elements to be held (holding step). The supplied topsheet 5 is arranged in such a manner to cover the heat generating elements 3 and the entire region of the backsheet 6, and therefore, the sheets 5 and 6 are joined to each other via the adhesive 7 applied to the backsheet 6. Thus, the heat generating elements 3 are held between the topsheet 5 and the backsheet 6.

In the case where the adhesive 7 is applied to a portion, or the entire region, of each of the surfaces CS of the backsheet 6 that are planned to oppose the heat generating elements 3, the heat generating elements 3 are held between the topsheet 5 and the backsheet 6 while being joined via the adhesive 7. In any case, a continuous main body portion 2A produced through the topsheet joining unit 150 is a continuous body in which the heat generating elements 3 are held between the topsheet 5 and the backsheet 6.

After that, it is preferable that the ear strap portion forming unit 160 supplies the ear strap sheet web 4S onto the outer surface of the topsheet 5 in the continuous main body portion 2A and joins the ear strap sheet web 4S and the topsheet 5 to each other to form joined regions 9. Thus, a continuous body 1A of warming tools 1 in which the ear strap portions 4 are formed is formed.

Finally, in the product cutter unit 170, the continuous body 1A of the warming tools 1 are divided into separate warming tools 1 having predetermined dimensions, to thereby obtain warming tools 1 having the structure shown in FIG. 1. The thus obtained warming tools 1 can be stored or distributed to the market as, for example, packages in which the warming tools 1 are contained in sealed packaging materials such as pouches.

The manufacturing apparatus 100 of the present invention may also have a configuration in which the arrangement position of the perfume application unit 130 is different from that of the manufacturing apparatus 100 shown in FIG. 8.

More specifically, the perfume application unit 130 may be provided downstream of the arrangement position of the pair of second sealing portions 112 in the transporting direction R and upstream of the arrangement position of the cutter unit 115 in the transporting direction R. With this configuration, the perfume 8 can be continuously or intermittently added to the outer surface of the continuous heat generating element 3C on the non-air-permeable sheet 3g side. FIGS. 9(*a*) and 9(*b*) schematically show manufacturing apparatuses having this configuration.

It is preferable that the manufacturing apparatus 100 of the present invention includes nip roller portions 180 for pressing the continuous heat generating element 3C in its thickness direction, and a conveyor portion 190 for transporting the continuous heat generating element 3C to the cutter unit 115.

In the manufacturing apparatus 100, it is preferable that a perfume discharge port of the perfume application unit 130 preferably faces upward, and the discharge port is arranged so as to oppose the non-air-permeable sheet 3g constituting the continuous heat generating element 3C. FIG. 9(*a*) shows this example.

It is preferable that the manufacturing apparatus of the present invention includes the conveyor unit 190 and one or two or more guide rollers 191 for making it possible to detour the continuous heat generating element 3C during transport.

In the manufacturing apparatus 100, it is preferable that a perfume discharge port of the perfume application unit 130 preferably faces downward, and the discharge port is arranged so as to oppose the non-air-permeable sheet 3g constituting the continuous heat generating element 3C. FIG. 9(*b*) shows this example.

According to a method for manufacturing a warming tool 1 using this manufacturing apparatus 100, it is preferable that the step (scenting step) of adding the perfume to a surface that is planned to oppose the backsheet 6, of the non-air-permeable sheet 3g constituting the continuous heat generating element 3C is performed first. After that, it is preferable that the continuous heat generating element 3C scented with the perfume 8 is cut into separate heat generating elements 3. Then, it is preferable that the step (holding step) of causing the heat generating elements 3 to be held between the topsheet 5 and the backsheet 6 is performed, the heat generating elements 3 being arranged such that the backsheet 6 and the non-air-permeable sheet 3g oppose each other.

The scented positions of the non-air-permeable sheet 3g constituting the continuous heat generating element 3C can be positions that overlap the heat generating portions 3a in a plan view.

In the scenting step, it is preferable that, after the continuous heat generating element 3C has been formed as in the above-described manufacturing method, the perfume is added to the non-air-permeable sheet 3g of the continuous heat generating element 3C before the continuous heat generating element 3C is divided into the heat generating elements 3.

Figure 9A:
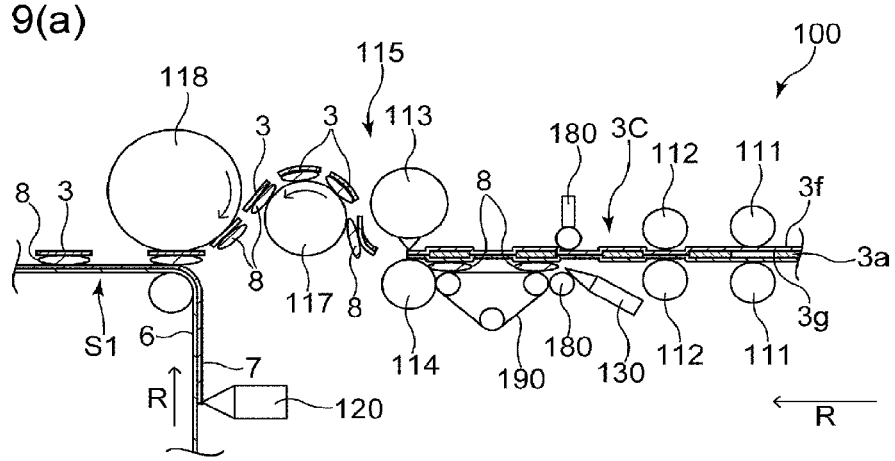
FIGS. 9(a) and 9(b) are schematic diagrams showing other embodiments of the manufacturing apparatus that is used for the manufacturing method of the present invention.

In the scenting step, it is preferable that, while the continuous heat generating element 3C is pressed by the nip roller portions 180, the perfume 8 is sprayed upward onto the non-air-permeable sheet 3g constituting the continuous heat generating element 3C. FIG. 9(a) shows this example.

Figure 9B:
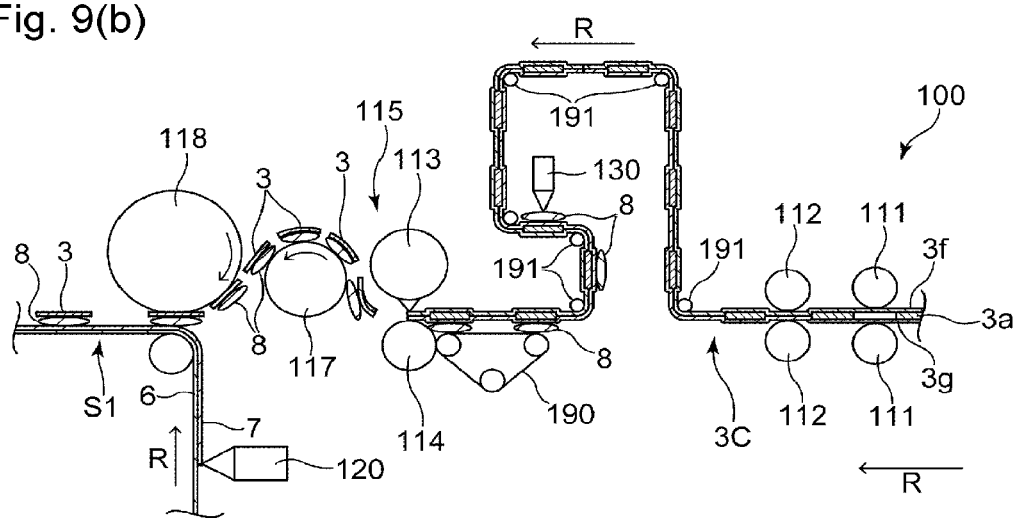

Alternatively, in the scenting step, it is preferable that, while the continuous heat generating element 3C is transported in a detoured manner, the perfume 8 is added, preferably by being sprayed downward, to the non-air-permeable sheet 3g constituting the continuous heat generating element 3C. In this manner, dripping of the perfume 8 from the perfume application unit 130 can be prevented, and the perfume can thus be prevented from adhering to an unintended portion of the continuous heat generating element 3C or the manufacturing apparatus 100. As a result, it is possible to facilitate the scenting of desired positions on the continuous heat generating element 3C with the perfume, and contamination of the manufacturing apparatus by the perfume can be reduced. FIG. 9(b) shows this example.

Then, the continuous heat generating element 3C to which the perfume 8 has been added is introduced into the cutter unit 115 by the conveyor unit 190 and divided into separate heat generating elements 3. These heat generating elements 3 have the perfume 8 added to their non-air-permeable sheet 3g side.

These heat generating elements 3 are transported while being transferred onto the circumferential surfaces of the transfer drum 117 and the repitch drum 118, and are then supplied onto the backsheet 6 at predetermined intervals. The heat generating elements 3 are supplied such that the non-air-permeable sheet 3g thereof oppose the backsheet 6.

The continuous heat generating element 3C to which the perfume 8 has been added can be transported in a state in which its surface to which the perfume 8 has been added and the conveyor portion 190 oppose each other. Also, the divided separate heat generating elements 3 can be transported in a state in which the surface to which the perfume 8 has been added opposes the conveyor portion 117. In this case, from the viewpoint of preventing the perfume 8 from adhering to a constituent member, such as the conveyor unit 190 or the transfer drum 117, of the manufacturing apparatus 100 and thereby reducing contamination of the manufacturing apparatus by the perfume, a configuration is preferable in which the positions to which the perfume 8 has been added do not come into contact with the conveyor portion 190 or the transfer drum 117.

To realize this configuration, for example, a transport belt installed in the conveyor unit 190 can be intermittently arranged in a direction that is orthogonal to the transporting direction R so that the transport belt is not present at locations that are to oppose the positions to which the perfume 8 has been added; or recesses in a circumferential surface of the transfer drum 117 can be intermittently arranged in the axial direction of the transfer drum 117.

Then, it is preferable that the topsheet joining unit 150 joins the topsheet 5 and the backsheet 6 to each other via the adhesive 7 to thereby cause the heat generating elements 3 to be held between the topsheet 5 and the backsheet 6 (holding step). Thus, a continuous main body portion 2A is formed.

After that, the ear strap portion forming unit 160 forms a continuous body 1A of warming tools 1 in which ear strap portions 4 and joined regions 9 are formed, and then, in the product cutter unit 170, the continuous body 1A of the warming tools 1 are divided into separate warming tools 1 having predetermined dimensions. Warming tools 1 to be manufactured are thus obtained.

The manufacturing apparatus 100 of the present invention may also have a configuration in which the arrangement position of the perfume application unit 130 is further different from that of the manufacturing apparatus 100 shown in FIG. 8.

Figure 10:
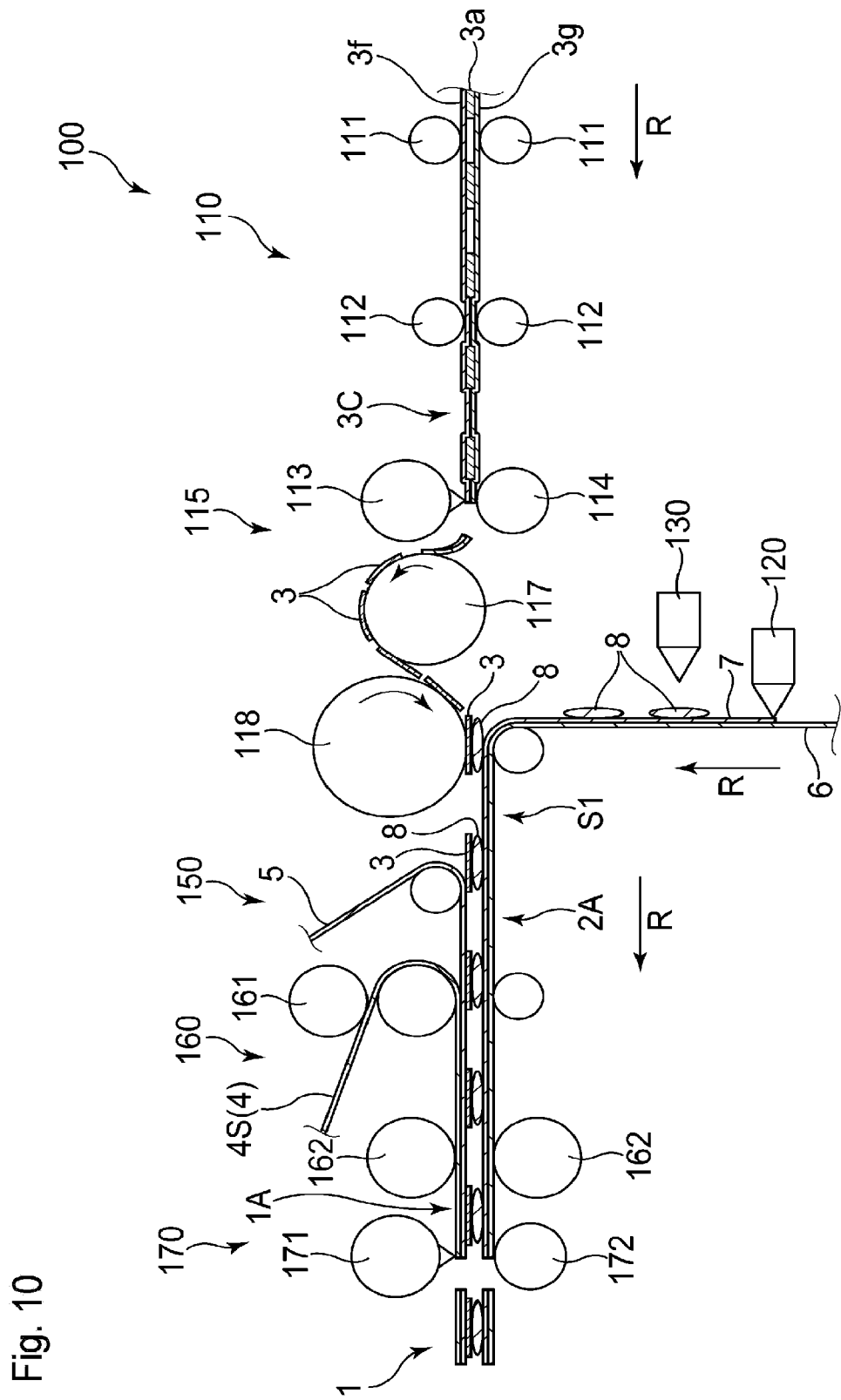
FIG. 10 is a schematic diagram showing yet another embodiment of the manufacturing apparatus that is used for the manufacturing method of the present invention.

More specifically, the perfume application unit 130 may be provided downstream of the adhesive application unit 120 in the transporting direction R. With this configuration, the perfume 8 can be continuously or intermittently added to the surface of the backsheet 6 to which the adhesive 7 has been applied. FIG. 10 schematically shows a manufacturing apparatus having this configuration.

It is preferable that, according to a method for manufacturing a warming tool 1 using this manufacturing apparatus 100, the step (scenting step) of adding the perfume to regions of the backsheet 6, the regions containing surfaces that are planned to oppose the heat generating elements 3, is performed, and then, the step (holding step) of causing the heat generating elements 3 to be held between the topsheet 5 and the backsheet 6, the heat generating elements 3 being arranged such that the backsheet 6 and the non-air-permeable sheet 3g oppose each other, is performed.

In this manufacturing method, it is preferable that, after the continuous heat generating element 3C has been formed as in the above-described manufacturing method, the continuous heat generating element 3C is directly introduced into the cutter unit 115 without adding the perfume 8 thereto, to obtain divided separate heat generating elements 3.

None of the heat generating elements 3 obtained through this step are scented with the perfume 8. These heat generating elements 3 are transported while being transferred onto the circumferential surfaces of the transfer drum 117 and the repitch drum 118, and are then supplied onto the backsheet 6.

It is preferable that, separately from the step of forming the heat generating elements 3, the adhesive application unit 120 continuously or intermittently applies the adhesive 7 to one surface of the web of the backsheet 6. After that, the scenting step is performed on a surface of the backsheet 6 that contains the surfaces that are planned to oppose the heat generating elements 3. The surface of the backsheet 6 to which the adhesive 7 has been applied constitutes surfaces that are planned to oppose the heat generating elements 3 in the steps thereafter and also a surface that is planned to oppose the topsheet 5. That is to say, the perfume application unit 130 continuously or intermittently adds the perfume 8 to the same surface as the surface of the backsheet 6 to which the adhesive 7 has been applied, while the backsheet 6 is being transported in the transporting direction R.

Next, it is preferable that, onto the surface of the transported backsheet 6 to which the adhesive 7 and the perfume 8 have been arranged, the heat generating elements 3 to which the perfume 8 has not been applied are arranged at predetermined intervals via the repitch drum 118.

At this time, from the viewpoint of realizing good heat generating performance of the heat generating elements 3, it is preferable that the heat generating elements 3 are arranged onto the backsheet 6 such that the surface of the backsheet 6 to which the adhesive 7 has been applied and the non-air-permeable sheet 3g of the heat generating elements 3 oppose each other. Thus, a stack S1 in which the heat generating elements 3 are arranged on one surface of the backsheet 6 is formed.

Subsequently, it is preferable that the topsheet joining unit 150 supplies the web of the topsheet 5 to a side of the stack S1 on which the air-permeable sheet 3f of the heat generating elements 3 is located, and joins the topsheet 5 and the backsheet 6 to each other via the adhesive 7 to thereby cause the heat generating elements to be held between the topsheet 5 and the backsheet 6 (holding step). Thus, a continuous main body portion 2A is formed.

After that, the ear strap portion forming unit 160 forms a continuous body 1A of warming tools 1 in which ear strap portions 4 and joined regions 9 are formed, and then, in the product cutter unit 170, the continuous body 1A of the warming tools 1 are divided into separate warming tools 1 having predetermined dimensions. Warming tools 1 to be manufactured are thus obtained.

An example of the form of arrangement of the perfume 8 in the present embodiment is a form in which the adhesive 7 is applied to a portion of each of the surfaces CS of the backsheet 6 that are planned to oppose the heat generating elements 3, and then, the perfume 8 is added to a portion of the planned opposing surface CS to which the adhesive 7 is not applied. FIG. 11(*a*) shows this example.

Warming tools 1 obtained by arranging the perfume 8 in such a form may be those of the above-described embodiments shown in FIG. 3(*a*) or FIGS. 4(*a*) and 4(*b*). In the cases where, the perfume 8 is also added to the portion to which the adhesive 7 is applied, as well as the portion to which the adhesive 7 is not applied, resulting warming tools 1 may be those of the above-described embodiments shown in FIGS. 5(*a*) and 5(*b*), FIGS. 6(*a*) and 6(*b*), FIG. 7, or FIG. 8.

An example of another form of arrangement of the perfume 8 is a form in which the adhesive 7 is applied so as to cover a portion of each of the surfaces CS of the backsheet 6 that are planned to oppose the heat generating elements 3, and then, the perfume 8 is continuously or intermittently added onto the adhesive 7 arranged in the region of that portion of the planned opposing surface CS. FIG. 11(*b*) shows this example.

An example of yet another form of arrangement of the perfume 8 is a form in which the adhesive 7 is applied so as to cover the entire region of each of the surfaces CS of the backsheet 6 that are planned to oppose the heat generating elements 3, and then, the perfume 8 is continuously or intermittently added to any position where the adhesive 7 is arranged. FIG. 11(*c*) shows this example.

Of the above-described forms of arrangement of the perfume 8, the forms in which the arrangement positions of the perfume 8 overlap the application positions of the adhesive 7 on the backsheet 6 are preferable. That is to say, it is preferable that the adhesive application unit 120 applies the adhesive 7 to the surfaces CS of the backsheet 6 that are planned to oppose the heat generating elements 3, and then, the perfume application unit 130 adds the perfume 8 onto the applied adhesive 7.

With this configuration, the perfume 8 is supplied and arranged such that the perfume 8 added onto the adhesive 7 on the backsheet 6 opposes the heat generating elements 3. Therefore, even when the backsheet 6 to which the perfume 8 has been added is supplied to the steps thereafter, transport can be performed while preventing the surface of the backsheet 6 to which the perfume 8 has been added from coming into contact with transporting means such as a conveyor and rollers included in the manufacturing apparatus 100, and accordingly, contamination of the manufacturing apparatus can be reduced even further.

In addition, a layer of the adhesive 7 can be formed between the backsheet 6 and the perfume 8, and therefore, compared with a case in which the applied perfume 8 is directly applied to the backsheet 6, seepage of the perfume 8 through the backsheet 6 to the outer surface side thereof can be prevented. As a result, contamination of the manufacturing apparatus and discomfort such as stickiness of a sheet outer surface of the manufactured warming tool 1, caused by the seepage of the perfume, can be reduced. Furthermore, during use of the warming tool 1, a good fragrance from the perfume can be emitted.

Examples of the perfume used in the present invention include, in addition to the aforementioned fragrant components, natural essential oils such as rose oil, lavender oil, eucalyptus oil, chamomile oil, lavandin oil, rosemary oil, and geranium oil, peppermint oil and spearmint oil, oils extracted from citrus fruits such as yuzu, and oils extracted from plants such as cherry blossoms; and 1-menthol and dl-menthol. When necessary, one or more solvents such as ethanol, propylene glycol, triacetin, 1,3-butanediol, dipropylene glycol, ethyldiglycol, isopropyl myristate, benzyl benzoate, triethyl citrate, and diethyl phthalate may be used together with the perfume.

With the above-described warming tool manufacturing method including the scenting step and the holding step, contamination of the manufacturing apparatus by the perfume can be prevented. Thus, even when manufacturing warming tools 1 using a single manufacturing device and using different types of perfumes for different product types, the cleaning operation for removing the perfume adhering to the apparatus can be simplified, or is no longer necessary. Therefore, the length of time the manufacturing apparatus and the manufacturing line are stopped when performing a cleaning operation is reduced, and the maintainability of the apparatus improves. As a result, warming tools that are scented using different perfumes for different product types can be produced with high production efficiency.

When forming the continuous heat generating element 3C, temperature conditions of heat rollers and the like and clearance conditions between rollers do not need to be adjusted each time according to whether or not a perfume is used or the type of the perfume used, and therefore, warming tools can be produced with high production efficiency.

Even when manufacturing warming tools to which a perfume is added and warming tools to which no perfume is added using the same manufacturing apparatus, the scent of the perfume can be effectively prevented from transferring to the warming tools to which no perfume is added.

In particular, according to the embodiment shown in FIG. 10, while the constituent members of the manufacturing apparatus 100 are appropriately spaced to facilitate maintenance such as perfume replacement and cleaning of the manufacturing apparatus, the perfume is added to positions that are unlikely to come into contact with the constituent members of the apparatus. Therefore, the maintainability of the manufacturing apparatus improves even more, and the production efficiency when manufacturing warming tools that are not scented with a perfume after manufacturing warming tools scented with a perfume improves even more.

In the warming tool 1 that is manufactured using the present manufacturing method, the perfume 8 is provided between the non-air-permeable sheet 3g and the backsheet 6, and therefore, the oxidizable metal that contributes to the generation of gentle heat can be sufficiently brought into contact with oxygen in air from the air-permeable sheet 3f side. As a result, sufficient heat generating performance of the heat generating elements 3 due to oxidation reaction can be achieved. And, the perfume volatilizes due to the generated gentle heat and makes the user of the warming tool perceive a good fragrance, and thus, the feel during use can be improved.

In addition, the perfume 8 is not arranged in portions that come into direct contact with the user, and this has the advantage of reducing the sticky feel caused by the perfume during use of the warming tool 1 that is manufactured.

Sheet materials that can be used for the first sheet 3f and the second sheet 3g that constitute the heat generating elements 3, the ear strap portions 4, and the topsheet 5 and the backsheet 6 can be determined as appropriate taking the air permeability, moisture permeability, texture, elasticity, and strength of these constituent members, and the properties, such as leak-proofness, of materials constituting the heat generating sheet and the heat generating composition. For example, fiber sheets such as nonwoven fabric, woven fabric, or paper, resin foam sheets, metal sheets, or resin films, or combinations thereof can be used.

Whether or not a sheet is air-permeable is judged by measuring air permeability in conformity with JIS P8117, and a sheet with an air permeability of 50000 seconds or less is regarded as an "air-permeable sheet", while a sheet with an air permeability of greater than 50000 seconds is regarded as a "non-air-permeable sheet".

Whether or not a sheet is moisture-permeable is judged by measuring moisture permeability in conformity with JIS Z0208, and a sheet with a moisture permeability of 100 g/m$^2$·24 hr or more is regarded as a "moisture-permeable sheet", while a sheet with a moisture permeability of less than 100 g/m$^2$·24 hr is regarded as a "non-moisture-permeable sheet".

Melt-blown nonwoven fabrics are preferably used as sheet materials that are highly air-permeable and moisture-permeable.

Air-through nonwoven fabrics and thermal bonded nonwoven fabrics are preferably used as sheet materials that are used in order to improve the texture.

Air-through nonwoven fabrics, spunbonded nonwoven fabrics, thermal bonded nonwoven fabrics, and the like that contain synthetic fibers such as polyester, polyethylene, and polypropylene, such as polyethylene terephthalate, for example, are used as sheet materials that are used in order to realize elasticity.

Spunbonded nonwoven fabrics and spunlaced nonwoven fabrics are preferably used as sheet materials that are used in order to impart strength. When necessary, sheet materials obtained by surface-treating various types of nonwoven fabrics with silicone, a surfactant, or the like may also be used.

These sheet materials may be composed of fibers made of a single raw material, or composed of a mixture of two or more types of fibers of different raw materials, fiber diameters, fiber crimp levels, and the like.

It is also possible to realize desired properties by combining the above-described sheet materials using, for example, a method in which a plurality of sheet materials are stacked.

From the viewpoint of making it easy for the perfume 8 to be favorably held on the second sheet 3g side, it is preferable that the outer surface of the second sheet 3g includes pulp fibers. That is to say, it is preferable that the warming tool 1 contains pulp fibers in the surface of the second sheet 3g of the heat generating elements 3 that opposes the backsheet 6.

Pulp fibers are composed of cellulose, and cellulose molecules contain many methylidyne groups, which are highly lipophilic. Methylidyne groups have a high affinity for the above-described fragrant components of the perfume, and therefore, the presence of pulp fibers in the outer surface of the second sheet 3g enables the perfume 8 applied thereto to be favorably held.

As a configuration in which pulp fibers are contained in the outer surface of the second sheet 3g, paper may also be used alone as the second sheet 3g. From the viewpoint of employing a non-air-permeable sheet as the second sheet 3g and thereby enabling even more appropriate control of heat generation by the heat generating portions 3a, it is preferable to use a laminated sheet constituted by a non-air-permeable resin film and paper. The term "laminated" means that, due to the presence of a constituent resin of the resin film between the fibers of the paper, the film and the paper are unpeelably bound to each other, and no other adhesives are used to join the film and the paper to each other.

As described above, it is preferable that the heat generating portions 3a contain an oxidizable metal and activated carbon. Specific examples of the heat generating portions 3a include those having a heat generating sheet constituted by a fiber sheet containing the oxidizable metal, activated carbon, a fibrous material, an electrolyte, and water, or a heat generating composition in paste or powder form, the composition containing the oxidizable metal, activated carbon, a water retention agent, an electrolyte, and water.

As the various materials constituting the heat generating sheet and the heat generating composition, for example, materials disclosed in paragraphs [0010] to [0017] of JP 2003-102761A and paragraphs [0029] to [0034] and [0040] to [0044] of JP 2006-340928A can also be used.

Although the present invention has been described based on preferred embodiments thereof, the present invention is not limited to the foregoing embodiments.

Figure 11A:
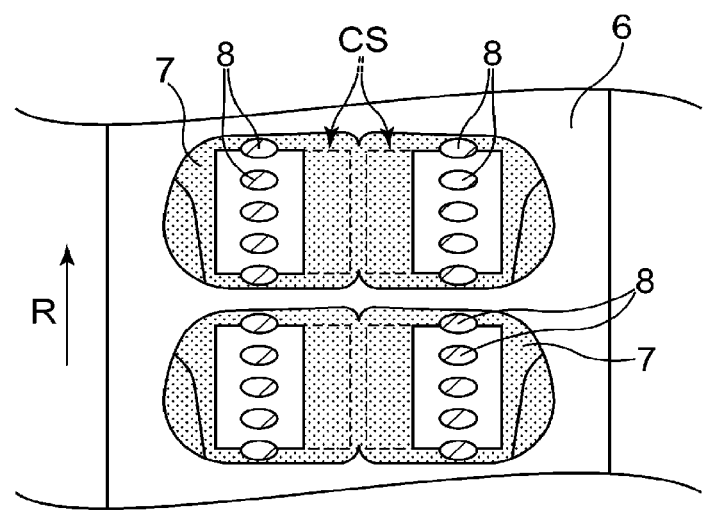
FIGS. 11(a) to 11(c) are plan views schematically showing the arrangement positions of a perfume and an adhesive according to the manufacturing method of the present invention.
Figure 11B:
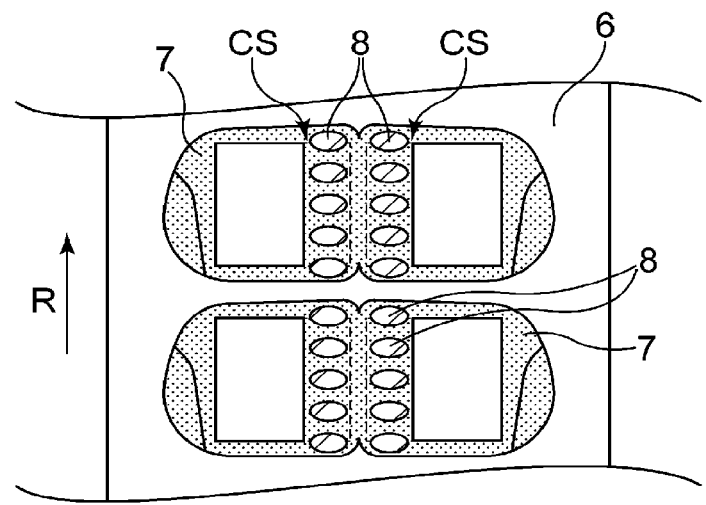
Figure 11C:
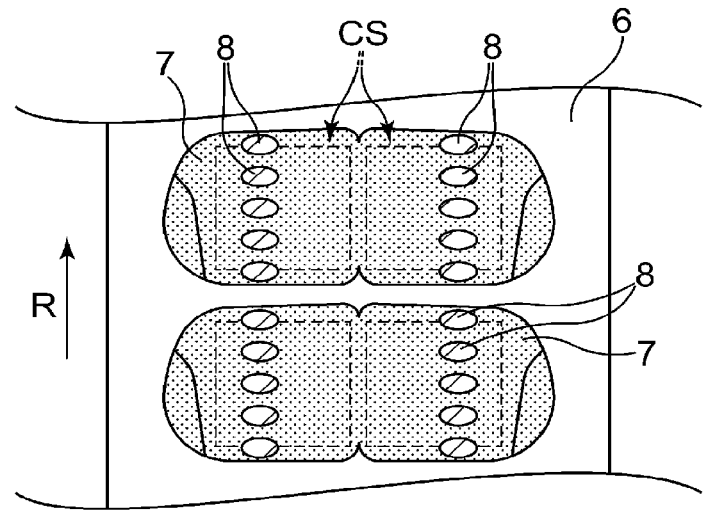

For example, the perfume 8 shown in FIGS. 11(a) to 11(c) are intermittently arranged in the transporting direction R, but the form of arrangement is not limited to these forms, and the perfume 8 may be arranged at one or more positions in the form of a stripe pattern (strip-like form), a dotted pattern, a checkered pattern, or the like.

FIGS. 4(a), 5(a), 6(a), and 7 show an embodiment in the case where the perfume 8 is arranged in the form of a stripe pattern (strip-like form).

Similarly, the perfume 8 may also be continuously or intermittently arranged in a direction that crosses the transporting direction R.

The form of the ear strap portions 4 of the warming tool 1 is not limited to the sheet-like member shown in FIGS. 1 and 2 as long as the main body portion 2 can be fixed to the eyes of the user, and string-, thread-, or strip-like members, or ear strap portions 4 made of an elastic material, may also be employed.

As the form of the heat generating elements 3 in the above-described warming tool 1, a form in which two heat generating elements 3 are held spaced apart from each other has been described, but changes can be made as appropriate according to the shape of the heating target.

For example, a single heat generating element 3 of a shape and a size that can cover the heating target may be held between the topsheet 5 and the backsheet 6, or three of more heat generating elements may be held between the topsheet 5 and the backsheet 6.

INDUSTRIAL APPLICABILITY

According to the present invention, a warming tool can be manufactured while preventing contamination of a manufacturing apparatus and a product by a perfume.

Moreover, according to the present invention, a warming tool that realizes a sufficient fit and a good fragrance of a perfume during use is provided.

The invention claimed is:

1. A warming tool, comprising:
a topsheet which faces a heating target during use;
a backsheet which is located on a side away from the heating target; and
a heat generating element which is sandwiched between the topsheet and the backsheet, wherein
the heat generating element comprises:
   a first sheet that is arranged so as to oppose the topsheet;
   a second sheet that is arranged so as to oppose the backsheet; and
   a heat generating portion that is sandwiched between the first sheet and the second sheet,
a perfume and an adhesive are arranged between the second sheet and the backsheet, the adhesive bonding the second sheet and the backsheet to each other,
in a plan view, a region in which the adhesive is arranged and a region in which the perfume is not arranged overlap each other, and
in the plan view, the region in which the adhesive is arranged overlaps an arrangement region of the heat generating portion.

2. The warming tool according to claim 1, wherein, in the plan view, a region in which the perfume is arranged overlaps an arrangement region of the heat generating element.

3. The warming tool according to claim 1, wherein, in the plan view, a region in which the perfume is arranged is located only in a surface that is planned to oppose the heat generating element.

4. The warming tool according to claim 1, wherein, in the plan view, a region in which the perfume is arranged overlaps a surface that is planned to oppose the heat generating portion.

5. The warming tool according to claim 1, wherein
an arrangement region of the heat generating element in the plan view includes: an overlapping region in which both the adhesive and the perfume are arranged; and a non-overlapping region in which the adhesive is arranged but the perfume is not arranged, and
a peeling strength (B) between the second sheet and the backsheet in the non-overlapping region is higher than a peeling strength (A) between the second sheet and the backsheet in the overlapping region.

6. The warming tool according to claim 1, wherein
an arrangement region of the heat generating element in the plan view includes: an overlapping region in which both the adhesive and the perfume are arranged; and a non-overlapping region in which the adhesive is arranged but the perfume is not arranged, and
a difference between a peeling strength between the second sheet and the backsheet in the non-overlapping region and a peeling strength between the second sheet and the backsheet in the overlapping region is from 1.5 N to 10 N.

7. The warming tool according to claim 1, which has a longitudinal direction and a length direction that is orthogonal to the longitudinal direction,
wherein a region in which the adhesive is not arranged extends to two end portions in the length direction.

8. The warming tool according to claim 1, which has a longitudinal direction and a length direction that is orthogonal to the longitudinal direction,
wherein a region in which the adhesive is arranged is formed at least in a region that is located in a middle when the total length of the warming tool in the longitudinal direction is divided into three equal regions.

9. The warming tool according to claim 1, which is an eye mask.

10. The warming tool according to claim 1, wherein the second sheet and the backsheet are adjacent to each other.

11. The warming tool according to claim 1, wherein the second sheet is a laminated sheet comprising a resin film and paper.

* * * * *